(12) United States Patent
Ukai et al.

(10) Patent No.: US 6,797,420 B2
(45) Date of Patent: Sep. 28, 2004

(54) POWER GENERATION DEVICE AND OPERATION METHOD THEREFOR

(75) Inventors: Kunihiro Ukai, Ikoma (JP); Takeshi Tomizawa, Ikoma (JP); Kiyoshi Taguchi, Osaka (JP); Toshiyuki Shono, Kyoto (JP); Koichiro Kitagawa, Fujisawa (JP); Tomonori Asou, Nara (JP); Masataka Ozeki, Izumi (JP); Shinji Miyauchi, Nara (JP); Akira Maenishi, Toyonaka (JP); Yutaka Yoshida, Nabari (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 536 days.

(21) Appl. No.: 09/914,376

(22) PCT Filed: Dec. 27, 2000

(86) PCT No.: PCT/JP00/09363

§ 371 (c)(1),
(2), (4) Date: Dec. 3, 2001

(87) PCT Pub. No.: WO01/48851

PCT Pub. Date: Jul. 5, 2001

(65) Prior Publication Data

US 2003/0035983 A1 Feb. 20, 2003

(30) Foreign Application Priority Data

| Dec. 28, 1999 | (JP) | ............ | 11/373856 |
| Dec. 28, 1999 | (JP) | ............ | 11/373857 |
| Dec. 28, 1999 | (JP) | ............ | 11/373859 |
| Jan. 14, 2000 | (JP) | ............ | 2000/005502 |
| May 12, 2000 | (JP) | ............ | 2000/139966 |

(51) Int. Cl.$^7$ .............................. H01M 8/04; H01M 8/14
(52) U.S. Cl. .............................. 429/25; 429/17; 429/20; 429/28
(58) Field of Search .................... 429/17, 20, 24, 429/25

(56) References Cited

FOREIGN PATENT DOCUMENTS

| JP | 57-212775 | * 12/1982 |
| JP | 57-212776 | * 12/1982 |
| JP | 57-212778 | * 12/1982 |
| JP | 57-212779 | 12/1982 |
| JP | 62-241803 | 10/1987 |
| JP | 63-091165 | 6/1988 |
| JP | 08-119602 | 5/1996 |
| JP | 11-149931 | 6/1999 |
| JP | 11-250927 | 9/1999 |

* cited by examiner

*Primary Examiner*—Patrick Ryan
*Assistant Examiner*—Thomas H. Parsons
(74) *Attorney, Agent, or Firm*—McDermott Will & Emery LLP

(57) ABSTRACT

The present invention relates to an electric power generator and its operation method, which electric power generator is equipped with a hydrogen generator, a polymer electrolyte fuel cell for generating electric power using hydrogen rich gas from the hydrogen generator, a burner for heating the hydrogen generator, a flow rate controller for controlling the supply amount of a burning fuel to the burner, a communicating pathway connecting the flow rate controller and the burner, a joint where at least a residual fuel gas from a fuel electrode of the fuel cell and/or an incompletely generated gas from the hydrogen generator are combined into the communicating pathway, and a pressure-transferring pipe for releasing the pressure between the joint and the flow rate controller into the flow rate controller; the flow rate controller controls the supply amount of the burning fuel on the basis of the above-mentioned pressure.

15 Claims, 12 Drawing Sheets

POWER GENERATION DEVICE AND OPERATION METHOD THEREFOR

TECHNICAL FIELD

The present invention relates to an electric power generator including a hydrogen generator and a polymer electrolyte fuel cell. More specifically, the present invention relates to an electric power generator, which uses a residual fuel gas exhausted from a fuel electrode of the fuel cell and/or an incompletely generated gas exhausted from the hydrogen generator not having a desired composition as a part of a burning fuel gas for heating the hydrogen generator.

BACKGROUND ART (1) Electric Power Generator

A conventional electric power generator using a polymer electrolyte fuel cell will be described with reference to FIG. 3. In a polymer electrolyte fuel cell 1, an air electrode 2 and a fuel electrode 3 are disposed so that they sandwich a polymer electrolyte membrane 9 (for example, Nafion 117 manufactured by Du Pont). To the upstream side of the air electrode 2, a fan 4 for supplying the air is connected, and to the upstream side of the fuel electrode 3, a hydrogen generator 6 is connected via a switching valve 5. A burner 7 is provided adjacent to the hydrogen generator 6 and the hydrogen generator 6 is heated with heat generated in the burner 7. In the upstream side of the burner 7, a burning fuel flow rate controlling valve 8 is disposed.

When a raw material fuel such as natural gas or methanol and a raw material water necessary for the steam reforming reaction are supplied to the hydrogen generator 6 and a burning fuel is supplied to the burner 7 via the burning flow rate controlling valve 8, the temperature of the hydrogen generator 6 is increased to a predetermined temperature with a burning heat generated in the burner 7. Hydrogen gas generated in the hydrogen generator 6 is not necessarily a pure hydrogen gas and may contain impurity gases such as carbon monoxide and carbon dioxide, and therefore it is sometimes called hydrogen rich gas. In a gas generated when the temperature of the hydrogen generator 6 is outside the predetermined temperature range, a large amount of poisoning components such as CO is contained, and this gas is exhausted from the hydrogen generator 6 as an incompletely generated hydrogen rich gas which does not have a desired composition. This incompletely generated gas is not supplied to the fuel electrode 3 but exhausted to the outside via the switching valve 5.

When the temperature of the hydrogen generator 6 is increased to a predetermined temperature and a hydrogen rich gas having a desired composition is obtained, this is supplied to the fuel electrode 3 by operating the switching valve 5. Then, the polymer electrolyte fuel cell 1 starts electric power generation. Most of the hydrogen in the hydrogen rich gas supplied to the fuel electrode 3 is consumed in the electric power generation and the gas containing residual hydrogen is exhausted outside as a residual fuel gas from the fuel electrode 3.

In this manner, in the conventional electric power generator using a polymer electrolyte fuel cell, when the temperature of the hydrogen generator 6 is not in the predetermined temperature range, a large proportion of impurity gas other than hydrogen is contained in the generated gas, so this cannot be used as a fuel for the fuel electrode and is exhausted outside as an incompletely generated gas. As a consequence, there has been the problem that this incompletely generated gas might possibly catch fire with some fire source.

Further, the residual fuel gas exhausted from the fuel electrode 3 contains hydrogen that has not been consumed in the electric power generation. Consequently, the residual gas may also possibly catch fire with some fire source. Moreover, even if the residual fuel gas does not catch fire, there has been the problem that the operation efficiency of the electric power generator is decreased since a part of the hydrogen generated in the hydrogen generator is exhausted outside.

In this regard, the present invention has an object (first object) to solve the above-described problems that the prior art presents and to provide an electric power generator which does not exhaust outside the off gas containing hydrogen as it is, which does not have any possibility of inappropriately catching fire, and which have a high operation efficiency.

On the other hand, the hydrogen generator used in the electric power generator as above generates hydrogen using hydrocarbons such as natural gas, LPG, gasoline, naphtha, kerosene and methanol, water and the air. This is because hydrogen attracts attention as a prospective energy source substituting for fossil fuels.

In order to utilize hydrogen effectively, it is necessary to provide infrastructure such as hydrogen pipelines. As a method for providing such facilities, it is studied to use infrastructure which has already been built for transportation and conveyance of fossil fuels such as natural gas and fuels such as alcohol, and to reform the above fuels to generate hydrogen in the place where hydrogen is needed. For example, there have been a variety of propositions with regard to on-site electric power generator of medium and small size, namely, a technique of reforming natural gas (city gas) for fuel cells and a technique of reforming methanol for fuel cells as a power source for automobiles.

In order to reform the above fuels to generate hydrogen, a catalytic reaction at a high temperature is used, and typically, a steam reforming method, and an auto-thermal method using both a steam reforming and a partial oxidation together are used.

However, since a reforming reaction proceeds at a high temperature, an obtained reformed gas contains not only hydrogen but also carbon monoxide (CO) and carbon dioxide ($CO_2$) as by-products through reaction equilibrium. When the reformed gas is used in a fuel cell, particularly in a polymer electrolyte fuel cell, CO as a by-product poisons electrodes of the fuel cell and significantly deteriorate the performance thereof. For this reason, it is necessary to reduce the concentration of CO and $CO_2$ in the reformed gas to the lowest possible. For this purpose, in general, a modifying reactor for shift-react CO and water, and a CO purifier using CO oxidation method or methanation method are equipped downstream side of the reforming reactor to reduce the CO concentration in the reformed gas as low as several tens of ppm. Although the CO concentration of the reformed gas is around 10%, the CO concentration of a modified gas obtained after the reformed gas passes through the shifter is reduced to around 1%. Further, the CO concentration of a purified gas obtained after the modified gas passes though the CO purifier is reduced to several tens of ppm and this is supplied to the fuel cell.

Herein, specific catalytic temperatures in the reforming reaction, modifying (shift) reaction and CO purifying reaction are 650 to 750° C., 200 to 350° C. and 100 to 200° C., respectively. In particular, if the temperature of the purifier does not reach the temperature range, the CO concentration cannot be reduced to several tens of ppm and the obtained purified gas cannot be supplied to the fuel cell. As a consequence, the starting time of the fuel cell depends on the start-up time of the catalytic temperature of the purifier. Also, the temperature of the modifying catalyst contained in the shifter reaches the active temperature with waste heat after the termination of the reforming reaction, and the modifying reaction starts. Moreover, the temperature of the purifying catalyst contained in the CO purifier reaches the active temperature with waste heat after the termination of the modifying reaction, and the modifying reaction starts.

However, in some operation method, condensed water generated in the reaction in the reformer, shifter and purifier stays inside the gas pathway and this may delay the start-up time before the respective catalytic temperatures reach the predetermined temperatures. For example, when the operation is stopped after a short time has passed from the start of operation of the hydrogen generator, the temperature of the shifter and the purifier is not sufficiently increased, and water content in the reformed gas from the reformer and the modified gas from the shifter may condense and collect as condensed water in the lower portion of the purifier. When the hydrogen generator starts operation again under such condition, there is the problem that, since extra heat is needed to vaporize the collected condensed water, it takes a long time to increase the temperature of the purifying catalyst to the active temperature.

In view of this, with regard to the hydrogen generator used in the electric power generator, the present invention has an object to shorten the time before the temperature of the catalyst in the purifier reaches the catalytic active temperature (second object).

Next, as described above, in each of the reformer, shifter and purifier inside the hydrogen generator, a catalyst corresponding to the respective reaction is disposed. Since the reaction temperature varies in each catalyst, the temperature of each catalyst is required to be heated to the respective active temperature in order to generate and supply hydrogen stably. The reaction temperature of the reformer positioned upstream in the flow of the raw material fuel and several gases is the highest and the reaction temperature of the purifier is the lowest. For this reason, in the hydrogen generator using the conventional steam reforming method, the shifter and the purifier are heated successively with heat from the reformer (for example, heat retained in the reformed gas) or excess heat from the burner disposed in the reformer, in some cases.

As a consequence, in the case where the temperature of the respective reformer, shifter and purifier is not appropriate, hydrogen generation does not proceed effectively. For example, in the steam reforming method, water is supplied so as not to be short of stoichiometric amount of oxygen atoms necessary for generation of carbon dioxide from reaction of carbon atoms in the raw material fuel. Also, in order that the raw material fuel reacts with water, it is necessary that water is at least present in the form of steam.

However, in the case where the temperature of the reformer is low, the reforming reaction does not proceed even if water is supplied and water stays inside the hydrogen generator. Also, if the raw material fuel and water are supplied after the temperature of the reformer is increased, there is the possibility that the catalyst is deteriorated with heat in the heating process and the catalytic activity is decreased. For this reason, it is necessary to supply the raw material fuel and water while setting at an appropriate temperature. Further, the temperature of the gases in the downstream side from the reformer becomes higher than the heat-resistant temperature of the modifying catalyst. Consequently, in the case where gases having temperature over the heat-resistant temperature flow, it is necessary to actively cool from the reformer to the shifter to prevent the catalyst from deteriorating and losing the catalytic activity thereof.

Also, it is an object of the hydrogen generator to reduce sufficiently the CO concentration of the modified gas in the purifier and to supply the obtained purified gas as a hydrogen rich gas. However, it is complicated to measure the CO concentration at every start of the hydrogen generator and judge the time to start the supply of hydrogen according to the concentration. For this reason, desired is a simple and accurate method for detecting that the hydrogen generator in the electric power generator is in the normal operation condition (third object).

As the above-mentioned reforming catalyst, to be specific, a base metal such as nickel or a noble metal such as ruthenium is used, and as a modifying catalyst, a base metal of copper base or a noble metal such as platinum is used. Also, as the CO removing (purifying) catalyst, a noble metal such as platinum is used. In order to make sure that the reaction progresses in the respective reactors (reformer, shifter or purifier), it is necessary to strictly control the temperature of the above catalysts in a constant range.

If the catalytic activity is in a satisfactory condition, the reaction taking place in the reformer and the shifter is the equilibrium reaction, and the composition of the obtained gas can be determined unambiguously only by controlling the temperature under a constant pressure condition. This results from the fact that the reaction in the CO purifier is a reaction including disturbing factors of equilibrium reaction. As a consequence, in order to operate stably the hydrogen generator in the stationary state generating a constant amount of hydrogen or in the transient state where the amount of generated hydrogen varies, and to obtain a generated gas of a constant composition including by-products, it is the most important to maintain the temperature of the respective reactors as constantly as possible. In particular, if the generation amount of the generated gas is changed, the temperature of the respective reactors is liable to change, and therefore there is the problem that it is difficult to largely change the generation amount thereof.

In this regard, the present invention has an object to propose temperature detecting sites of the respective reactors and specific methods of temperature control corresponding thereto, thereby to provide a hydrogen generator excellent in operation property and convenience (fourth object).

Incidentally, known as dispersed type electric power generators are gas turbines and engines that generate electric power using burning energy of the fuel, and fuel cells using chemical reactions. Since fuel cells do not include physical operative part and are high in power generation efficiency, they attract attention from the viewpoint of energy saving. Most of the fuel cells generate electric power using hydrogen as the fuel. However, since infrastructure for hydrogen has not been established at the present time, hydrogen is generated by reforming hydrocarbon gases or raw materials such as naphtha and this hydrogen is supplied.

For example, phosphoric acid type fuel cells have been systemized using a hydrogen generator that generates hydrogen by steam reforming city gas and have been put into practice as stationary electric power generators. Also, polymer electrolyte fuels cells have been systemized with a hydrogen generator that reforms alcohol or city gas, and they are now being applied to electric power generator for automobile and home.

In these fuel cells, the amount of consumed hydrogen varies according to the amount of electric power. When the amount of electric power is changed, it is necessary to change the amount of hydrogen supplied from the hydrogen generator accordingly. However, if the amount of generated hydrogen is suddenly change, the temperature balance in the hydrogen generator is lost and hydrogen cannot be generated steadily. For this reason, the phosphoric acid type fuel cell power generators that have already put into practice cope with this problem by not changing the amount of electric power and operating at around the rated power generation output.

It is surely possible to operate fuel cells at the rated output by presuming the electric power consumption in the case where they are used in the place always having constant electric power consumption such as factories and apartment houses. However, in houses or cars where electric power consumption changes greatly, it is necessary to change quickly the amount of generated electric power by fuel cells according to the electric power consumption.

In view of this, the present invention has an object to provide a electric power generator that can change quickly the amount of power to be generated (fifth object).

DISCLOSURE OF INVENTION

The present invention provides an electric power generator equipped with: a hydrogen generator comprising a reformer, a shifter, a purifier, a gas pathway connecting the reformer, the shifter and the purifier, and a generated gas outlet; a polymer electrolyte fuel cell for generating electric power by using a generated gas from the above hydrogen generator and an oxidant gas; a burner for heating at least the reformer; a flow rate controller for controlling a supply amount of a burning fuel to the burner; a communicating pathway connecting the flow rate controller and the burner; a joint where a residual fuel gas exhausted from a fuel electrode of the fuel cell and/or an incompletely generated gas from the hydrogen generator are combined with the burning fuel in the communicating pathway;

said generator being characterized by further comprising a pressure-transferring pipe which transfers a pressure between the joint and the flow rate controller to the flow rate controller, the flow rate controller controlling the supply amount of the burning fuel on the basis of the pressure.

In the above-described electric power generator, it is effective that the flow rate controller comprises a valve, which moves by the pressure between the joint and the flow rate controller.

Also, it is desirable that a switching valve is provided between the joint and the pressure-transferring pipe.

Further, it is effective that the above-mentioned hydrogen generator is equipped with a condensed water outlet.

Moreover, it is effective that the above hydrogen generator is equipped with a condensed water outlet in at least one selected from the group consisting of the reformer, the shifter, the purifier, the gas pathway and the generated gas outlet.

In addition, it is effective that the condensed water outlet is equipped with a switching valve.

Further, the present invention provides a method for operating an electric power generator equipped with: a hydrogen generator comprising a reformer, a shifter, a purifier, a gas pathway connecting the reformer, the shifter and the purifier, and a generated gas outlet; a polymer electrolyte fuel cell for generating electric power by using a generated gas from the hydrogen generator and an oxidant gas; a burner for heating at least the reformer; a flow rate controller for controlling a supply amount of a burning fuel to the burner; a communicating pathway connecting the flow rate controller and the burner; a joint where a residual fuel gas exhausted from a fuel electrode of the fuel cell and/or incompletely generated gas from the hydrogen generator are combined with the burning fuel in the communicating pathway;

said method being characterized by supplying a raw material fuel and water to the reformer when the temperature of the gas pathway between the reformer and the shifter reaches a predetermined lower limit 1 after operating the burner.

Herein, it is effective that the above lower limit 1 is 100° C. to 400° C.

Also, it is effective that water is supplied between the reformer and the shifter such that the temperature between the reformer and the shifter does not exceed a predetermined upper limit, and that the above upper limit is 250° C. to 500° C.

Moreover, it is effective to judge that the electric power generator is in the normal operation condition when the temperature at the downstream of the purifier is not lower than a predetermined lower limit 2 and that the lower limit 2 is 100° C. to 500° C.

Still further, it is effective to control the temperature of the reformer by heating with the burner and to control the temperature of the shifter and the purifier by cooling.

In addition, it is effective to increase or decrease the supply amount of the raw material fuel and water to the reformer after increasing or decreasing the supply amount of the generated gas to the fuel cell according to the increase or decrease of an amount of generated electric power by the fuel cell.

BEST MODE FOR CARRYING OUT THE INVENTION

The present invention relates to an electric power generator equipped with: a hydrogen generator comprising a reformer, a shifter, a purifier, a gas pathway connecting the reformer, the shifter and the purifier, and a generated gas outlet, and generating a hydrogen rich gas from raw material fuel and water; a polymer electrolyte fuel cell for generating electric power by using a hydrogen rich gas (generated gas) from the above hydrogen generator and an oxidant gas; a burner for heating at least the reformer; a flow rate controller for controlling a supply amount of a burning fuel to the burner; a communicating pathway connecting the flow rate controller and the burner; a joint where a residual fuel gas exhausted from a fuel electrode of the fuel cell and/or an incompletely generated gas from the hydrogen generator are combined with the burning fuel in the communicating pathway;

said generator being characterized by further comprising a pressure-transferring pipe which transfers a pressure between the joint and the flow rate controller to the flow rate controller, the flow rate controller controlling the supply amount of the burning fuel on the basis of the pressure.

By disposing such a flow rate controller, at least a residual fuel gas (residual generated gas) exhausted from the fuel electrode or a hydrogen rich gas having an incomplete composition (incompletely generated gas) formed in the hydrogen generator (hereinafter also referred to simply as "off gas") is mixed with the burning fuel from the joint provided in the communicating pathway and is supplied to the burner.

Figure 1:
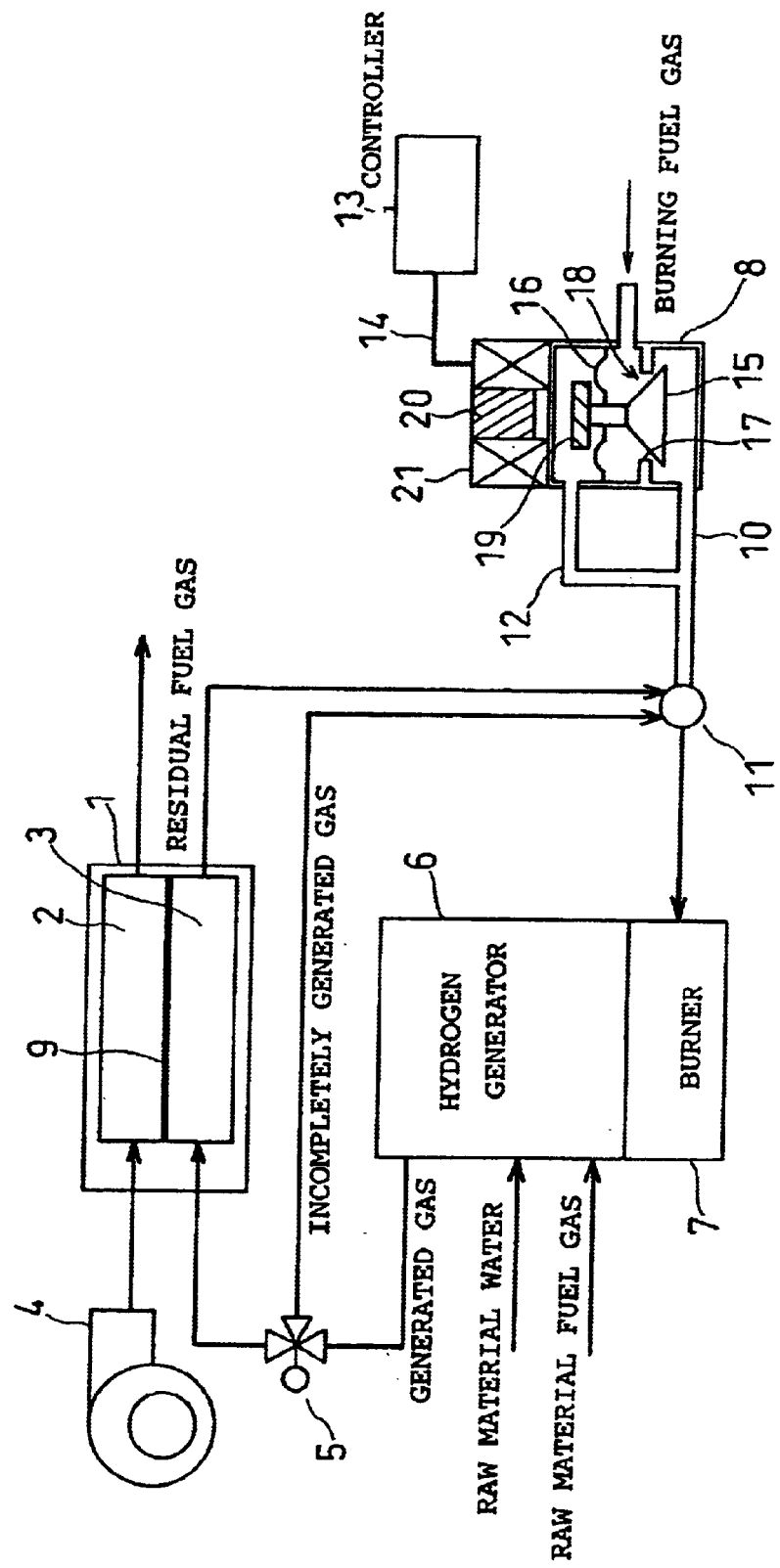
FIG. 1 is a schematic constitutional view of an electric power generator using a polymer electrolyte fuel cell as one embodiment of the present invention.

Above all, as shown in FIG. 1, it is effective that a flow rate controller 8 has a valve mechanism which moves by the pressure between the joint and the flow rate controller.

FIG. 1 is a schematic constitutional view of an electric power generator using a polymer electrolyte fuel cell as one embodiment of the present invention. By using the flow rate controller 8 equipped with a valve 15 as shown in FIG. 1, the gas flow rate in the downstream side of a joint 11 is increased due to mixing of the off gas, and thereby the flow resistance is increased. Then, the pressure of the burning fuel gas in the downstream side from the valve 15 is increased and the opening degree of the valve 15 is decreased. As a result, the amount of the burning fuel gas passing through the valve 15 via a space 18 between the valve 15 and an opening 17 is decreased. However, since the pressure between the joint 11 and the flow rate controller 8 is transferred to the upper side of the valve 15 through a pressure-transferring pipe 12, the aforementioned increase in the pressure decreases the opening degree of the valve 15, which enables to maintain the amount of burning fuel gas to a constant level.

On the contrary, in the case where the off gas amount is decreased, since the pressure between the flow rate controller 8 and the joint 15 is reduced, the opening degree of the valve 15 is increased and the amount of burning fuel gas passing space 18 is increased. However, since the pressure between the flow rate controller 8 and the joint 11 is released to the upper part of the valve 15 by the pressure-transferring pipe 12, the decrease in the pressure acts to decrease the opening degree of the valve 15, which maintains the amount of the burning fuel gas to a constant level.

That is to say, according to the present invention, even if the amount of the off gas mixed in the joint 11 is increased or decreased, the amount of the burning fuel gas can be maintained to a predetermined amount and thereby the burning condition of the burner 7 can be maintained stable. As a consequence, the off gas can be supplied to the burner 7 without being exhausted outside. Since the combustible off gas containing hydrogen is not exhausted outside, the possibility of catching fire can be eliminated. Further, by using effectively the off gas, the operation efficiency of the electric power generator using the fuel cell can be improved.

Figure 2:
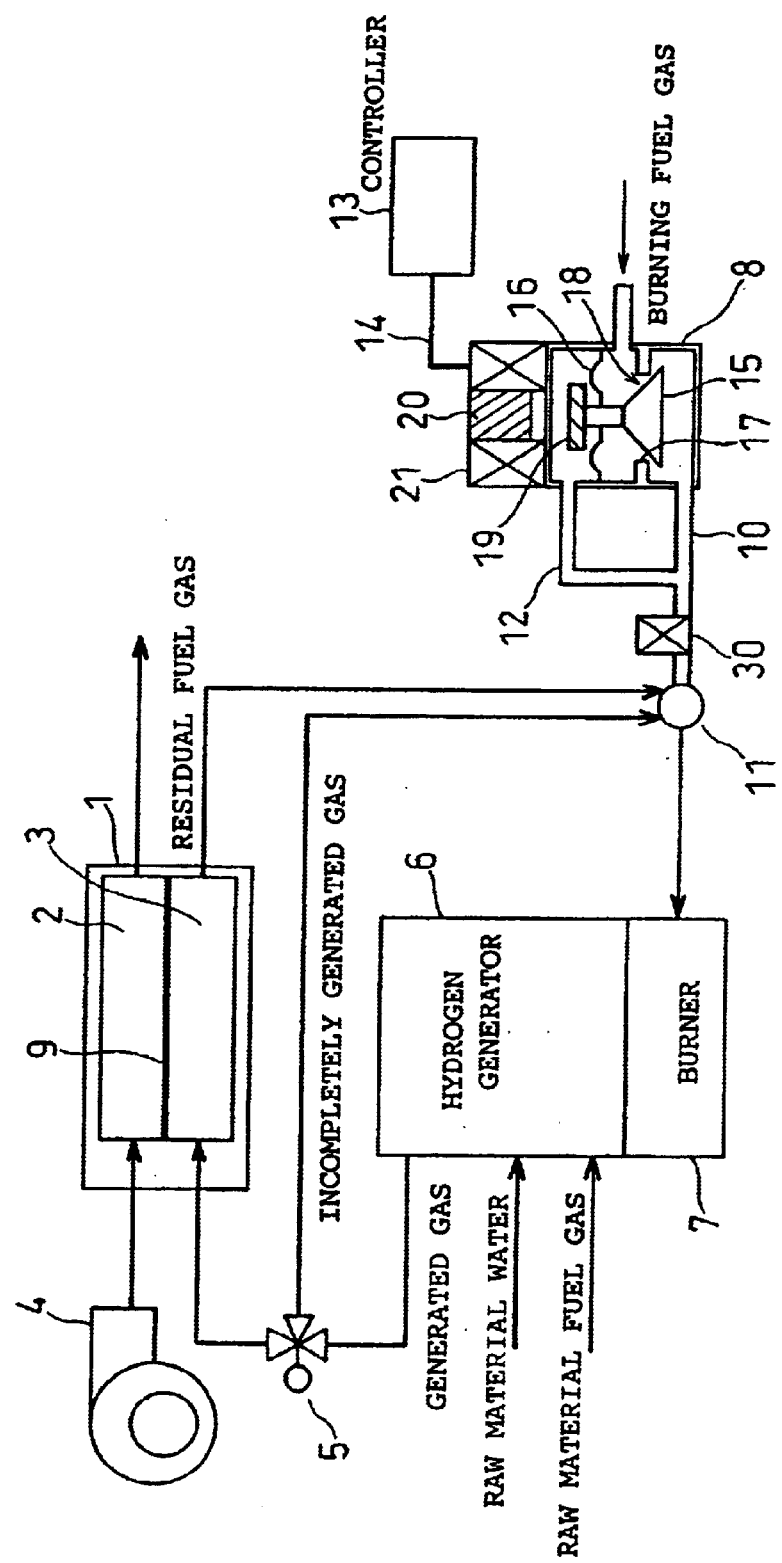
FIG. 2 is a schematic constitutional view of an electric power generator using a polymer electrolyte fuel cell as another embodiment of the present invention.

The off gas contains a large amount of steam. Therefore, in the case where a switching valve 30 as shown in FIG. 2 is not disposed, when the operation of the electric power generator, in particular the hydrogen generator 6 is stopped and the supply of the burning fuel gas is stopped, the off gas in the gas pathway of the hydrogen generator 6 is dispersed in the pressure-transferring pipe 12 and the flow rate controller 8, and the steam contained in the off gas is condensed while the temperature thereof drops. Since the condensed water is collected in the pressure-transferring pipe 12 and the flow rate controller 8, there arises another problem that the flow of the burning fuel gas pulsates at the restart of operation and the burning condition of the burner 7 becomes extremely unstable.

Therefore, the switching valve 30 may be disposed between the joint 11 and the pressure-transferring pipe 12. By closing the switching valve 30 at the start of operation, the joint 11 can be shut off from the pressure-transferring pipe 12 and the flow rate controller 8. When the joint 11 is shut off from the pressure-transferring pipe 12 and the flow rate controller 8, the diffusion of the off gas to the pressure-transferring pipe 12 and the flow rate controller 8 can be prevented, and also condensation of water can be prevented. In addition, the burning condition of the burner 7 can be maintained stable even with repetition of stop and restart of operation.

In the following, mode for carrying out the invention will be more specifically described with reference to drawings.

Embodiment 1

Figure 3:
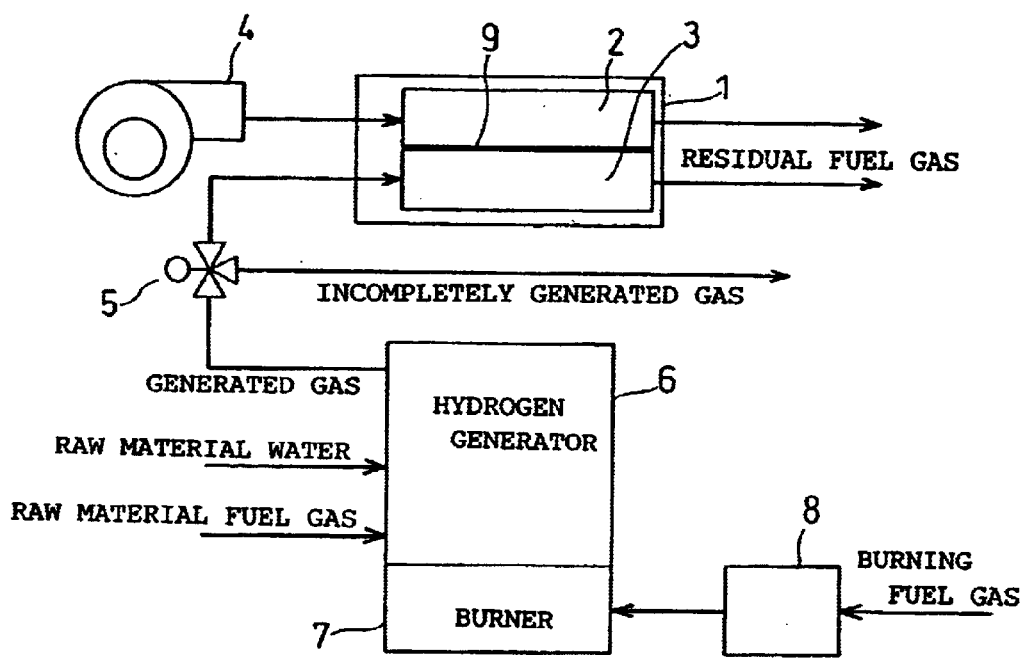
FIG. 3 is a schematic constitutional view of a conventional electric power generator using a polymer electrolyte fuel cell.

FIG. 1 is a schematic constitutional view of an electric power generator using a polymer electrolyte fuel cell as one embodiment of the present invention. In FIG. 1, the same reference numerals as in FIG. 3 are given to the constituting elements having the same function as the electric power generator using a convention polymer electrolyte fuel cell shown In FIG. 3. The function of these constituting elements is the same as those shown In FIG. 3.

In the upstream side of a burner 7, a flow rate controller 8 for burning fuel gas equipped with a valve mechanism is disposed. The flow rate controller 8 and the burner 7 are connected via a communicating pathway 10. The communicating pathway 10 is provided with a joint 11, and a residual fuel gas exhausted from a fuel electrode 3 and/or an incompletely generated gas from a hydrogen generator 6 is mixed in the joint 11.

A pressure-transferring pipe 12 is provided in the upstream side of the joint 11. A controller 13 and the flow rate controller 8 are connected via a signal line 14. Inside the flow rate controller 8, a valve 15 in the form of a reversed funnel is held by a diaphragm 16, and a space 18 constituted by an opening 17 and the valve 15 serves as a pathway for the burning fuel gas. On top of the valve 15, a magnet 19 is fixed, and an iron core 20 and a coil 21 are equipped upward the magnet 19 with a space therebetween. The space upside of the diaphragm 16 is connected to the downstream side of the flow rate controller 8 via the pressure-transferring pipe 12.

Next, the operation and the action of the electric power generator shown in FIG. 1 will be described. A controlling current is supplied to the coil 21 from the controller 13 via the signal line 14, a magnetic force repelling the magnet 19 is formed in the iron core 20, and the magnet 19 is pressed downward with a predetermined pressure. The space 18 regulating the amount of the burning fuel gas is formed between the valve 15 and the opening 17. The burning fuel gas flows in from a burning fuel gas inlet (not shown) of the flow rate controller 8, passes through the space 18, the communicating pathway 10 connected to a burning fuel gas outlet (not shown), the joint 11, and is supplied to the burner 7.

On the other hand, the off gas is supplied to the burner 7 mixed with the burning fuel gas from the joint 11 formed in the communicating pathway 10. Since the gas flow rate in the downstream side of the joint 11 is increased due to the mixing of the off gas, the flow resistance is increased and the pressure in the downstream side of the flow rate controller 8 is increased, and therefore the valve 15 is pressed upward. This narrows the space 18 and decreases the flow rate of the burning fuel gas. However, since the pressure increase in the downstream side of the flow rate controller 8 is transferred to the upside space of the diaphragm 16 through the pressure-transferring pipe 12, the diaphragm 16 is distorted downward and the valve 15 moves downward. Thus, the space 18 is enlarged and can prevent the decrease in the flow rate of the burning fuel gas, and the flow rate of the burning fuel gas can be maintained at a constant level.

In this manner, even if the amount of gas mixed in the joint 11 is increased or decreased, the flow rate of the burning fuel gas can be maintained at a constant level and the burning condition in the burner 7 can be maintained stable. As a result, the off gas can be supplied to the burner 7 without being exhausted outside. Since the off gas is not exhausted outside, the possibility that the combustible gas containing hydrogen catches fire can be eliminated, and thereby the operation efficiency of the electric power generator can be improved.

Embodiment 2

FIG. 2 is a schematic constitutional view of an electric power generator using a polymer electrolyte fuel cell as another embodiment of the present invention. The difference from Embodiment 1 is that a switching valve 30 is provided between the joint 11 and the pressure-transferring pipe 30. The constitutional elements indicated with the same reference numerals as those in Embodiment 1 have the same constitutions and functions as therein.

Next, explanation will be made about the operation and action. At the stop of operation, the switching valve 30 is closed and the joint 11 is shut off from the pressure-transferring pipe 12 and the flow rate controller 8. The off gas contains a large quantity of steam and therefore when the supply of the burning fuel gas is stopped at the normal stop of operation or the operation is stopped for some reason, the off gas is diffused in the pressure-transferring pipe 12 or in the diaphragm 16 inside the flow rate controller 8, and steam is condensed with a decrease in temperature. Since the condensed water is collected in the pressure-transferring pipe 12 and in the diaphragm 16, the space 18 changes even if the controlling current supplied to the coil 21 is constant. As a consequence, at the restart of operation, the flow of the burning fuel gas pulsates and becomes unstable, and the burning condition in the burner 7 becomes extremely unstable.

However, the joint 11 can be shut off from the pressure-transferring pipe 12 and the flow rate controller 8 by closing the switching valve 30 at the stop of operation, the diffusion of the off gas in the pressure-transferring pipe 12 and the flow rate controller 8 can be prevented, and therefore the generation of condensed water can also be prevented. Even with repetition of stop and restart of operation, the burning condition in the burner 7 can be maintained stable.

Also, in the above-described electric power generator, it is effective that the hydrogen generator is equipped with a condensed water outlet.

Further, it is effective that the shifter and the purifier are respectively equipped with a cooler and a temperature detector.

Moreover, it is effective that at least one of the shifter and the purifier has a multistage structure and is equipped with a cooler and a temperature detector at each stage.

Thus, the present invention also relates to a hydrogen generator having, as constituting elements, a raw material fuel supplier; a water supplier; an air supplier; a reformer equipped with a reforming catalyst for reacting a raw material fuel and water; a shifter equipped with a modifying catalyst for reacting carbon monoxide and water; a purifier equipped with a purifying catalyst for oxidizing carbon monoxide; a generated gas outlet for exhausting a generated gas (hydrogen rich gas) obtained from the purifier; and a gas pathway connecting the raw material fuel supplier, the reformer, the shifter, the purifier and the generated gas outlet; wherein a condensed water outlet is disposed at least one of the reformer, the shifter, the purifier, the generated gas outlet and the gas pathway.

In this hydrogen generator, it is effective to provide a switching valve in the condensed water outlet.

In operating this hydrogen generator, it is desirable that an opening operation of the switching valve in the condensed water outlet is made for a certain duration at the start of operation.

Also, it is effective that the start of purge operation with introduction of an inert gas and the opening operation of the switching valve in the condensed water outlet are synchronized.

Further, in the electric power generator of the present invention, it is effective to provide a water collector for collecting water from the exhaust gas (including residual fuel gas) exhausted the polymer electrolyte fuel cell and to introduce exhaust water from the condensed water outlet provided in the hydrogen generator to the water collector. With this measure, the exhaust water from the fuel cell can be collected without being left dropping outside. At this time, if the condensed water outlet of the hydrogen generator is disposed in the upstream side from the water collector, a flow of water is created with gravitation and the collection of water can be made easy.

Embodiment 3

Embodiment 3 of the present invention using a condensed water outlet will be described with reference to FIG. 4.

Figure 4:
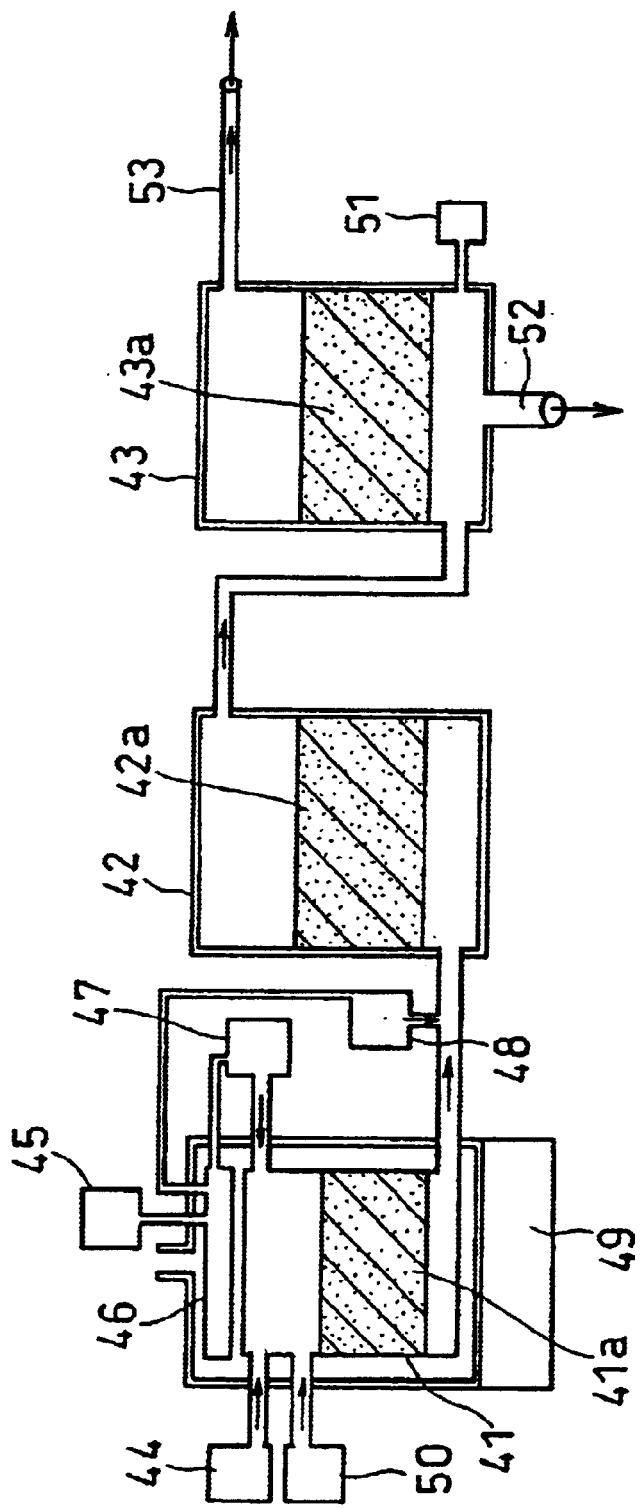
FIG. 4 is a constitutional view of a hydrogen generator used in the electric power generator of the present invention.

FIG. 4 is a schematic constitutional view of a hydrogen generator which can be used in the electric power generator of the present invention. In a reformer 41, provided is a reforming catalyst layer 41a in which alumina carrying ruthenium as a reforming catalyst is filled, and in a shifter 42, provided is a modifying catalyst layer 42a in which $CeO_2$ carrying platinum as a modifying catalyst is filled. In a CO purifier 43, provided is a purifying catalyst layer 43a in which alumina carrying a mixture of platinum-ruthenium as a CO purifying catalyst is filled. Possible configurations of carriers to carry the catalysts are, for example, powder-form, pellet-form, honeycomb-form and the like. Materials constituting such carriers can be selected suitably from ceramics and heat-resistant metals, for example.

A raw material fuel supplier 44 supplies gaseous hydrocarbon fuels such as natural gas (city gas) or LPG, or liquid hydrocarbon fuels such as gasoline, kerosene or methanol to the reformer 41.

This hydrogen generator is equipped with a water supplier 45, a steam generator 46, a steam supplier 47 to the reformer 41, and a steam supplier 48 to the shifter 42. A heater (burner) 49 heats the reforming catalyst layer 41a and the steam generator 46. A purge gas supplier 50 purges combustible gas present in the gas pathway of the hydrogen generator before the start of the hydrogen generator. Further, a purifying air supplier 51 to the purifier 43, a condensed water outlet 52 formed in the lower section of the purifier 43, and a generated gas outlet 53 are provided.

Operation of the hydrogen generator shown in FIG. 4 will be described in the following. The reformer 41 and the steam generator 46 are heated with the heater 49. After the reformer 41 is heated to a predetermined temperature, a supply of a raw material fuel from the raw material fuel supplier 44 to the reformer 41 is started, and a supply of water from the water supplier 45 to the steam generator 46 is started. A part of the steam generated in the steam generator 46 is supplied to the steam supplier 47, and the remainder is supplied to the steam supplier 48. The steam supplied from the steam supplier 47 to the reformer 41 and the raw material fuel supplied from the raw material fuel supplier 44 are mixed, and this mixture reaches the reforming catalyst layer 41a to start a reforming reaction. The reforming reaction may also be started in supplying the raw material fuel after the reforming catalyst layer 41a is filled with the steam.

An obtained reformed gas is mixed with the steam supplied from the steam supplier 48 and transferred to the shifter 42 to be used in a modifying reaction. A modified gas obtained in the shifter 42 is mixed with the air supplied from the purifying air supplier 51 and transferred to the purifier 43 to be purified. Then, a generated gas obtained finally is exhausted as a hydrogen rich as from the generated gas outlet 53.

For example, when the operation is stopped shortly after the start of operation, since the temperature of the shifter 42 and the purifier 43 is not sufficiently increased, water content in the reformed gas and the modified gas is condensed and is collected as a condensed water in the lower section of the purifier 43, for example. If the operation is restarted under such condition, heat is required for vaporizing collected water and therefore it takes a long time to increase the temperature of the purifying catalyst to the active temperature. As in this embodiment, the condensed water can be exhausted by providing the condensed water outlet 52.

Embodiment 4

Embodiment 4 of the present invention will be described with reference to FIG. 5.

Figure 5:
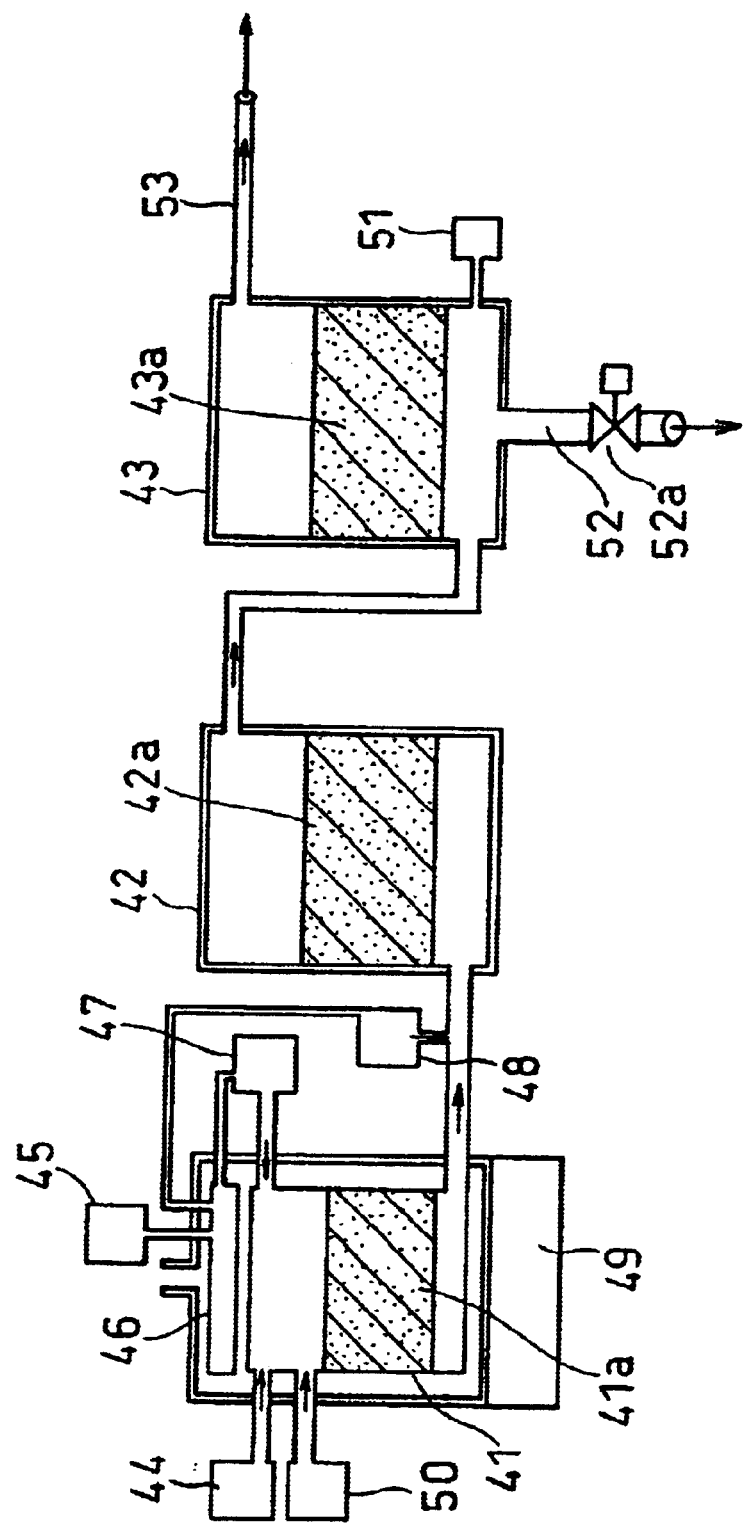
FIG. 5 is a schematic constitutional view of another hydrogen generator used in the electric power generator of the present invention.

FIG. 5 shows a schematic constitutional view of another hydrogen generator which can be used in the electric power generator of the present invention. In this embodiment, a switching valve 52a is provided in the condensed water outlet 52 in the hydrogen generator of Embodiment 3 to make a constitution in which opening and closing operation is easily made.

Embodiment 5

Embodiment 5 of the present invention relates to a method for operating a hydrogen generator in which opening operation of the switching valve 52a is made during a certain period of time at the start of operation and the restart of the operation in Embodiment 4 above. As a method for determining such certain period of time, there is a method to determine by measuring the time from the start of the opening operation, and a method to determine on the basis of temperature information in the position appropriated for judging the presence or absence of condensed water in the vicinity of the condensed water outlet 52. With these methods, it can be prevented that the switching valve 52a remains open although there is no more condensed water, and a hydrogen rich gas on the way of being formed in the hydrogen generator can be prevented from being exhausted because.

Embodiment 6

Embodiment 6 of the present invention relates to a further method for operating the hydrogen generator in the electric power generator.

For example, in the hydrogen generator in Embodiment 5 above, the start of the purge operation with introduction of an inert gas and the opening operation of the switching valve 52a of the condensed water outlet 52 are synchronized before the start. That is, the switching valve 52a is opened at the start of the purge operation, and the switching valve 52a is closed at the end of the purge operation. With this operation, condensed water in the pathway can be pushed out to the condensed water outlet 52 and exhausted with a high pressure owing to the purge operation without fail at the start of operation and before the restart of the operation.

Embodiment 7

Figure 6:
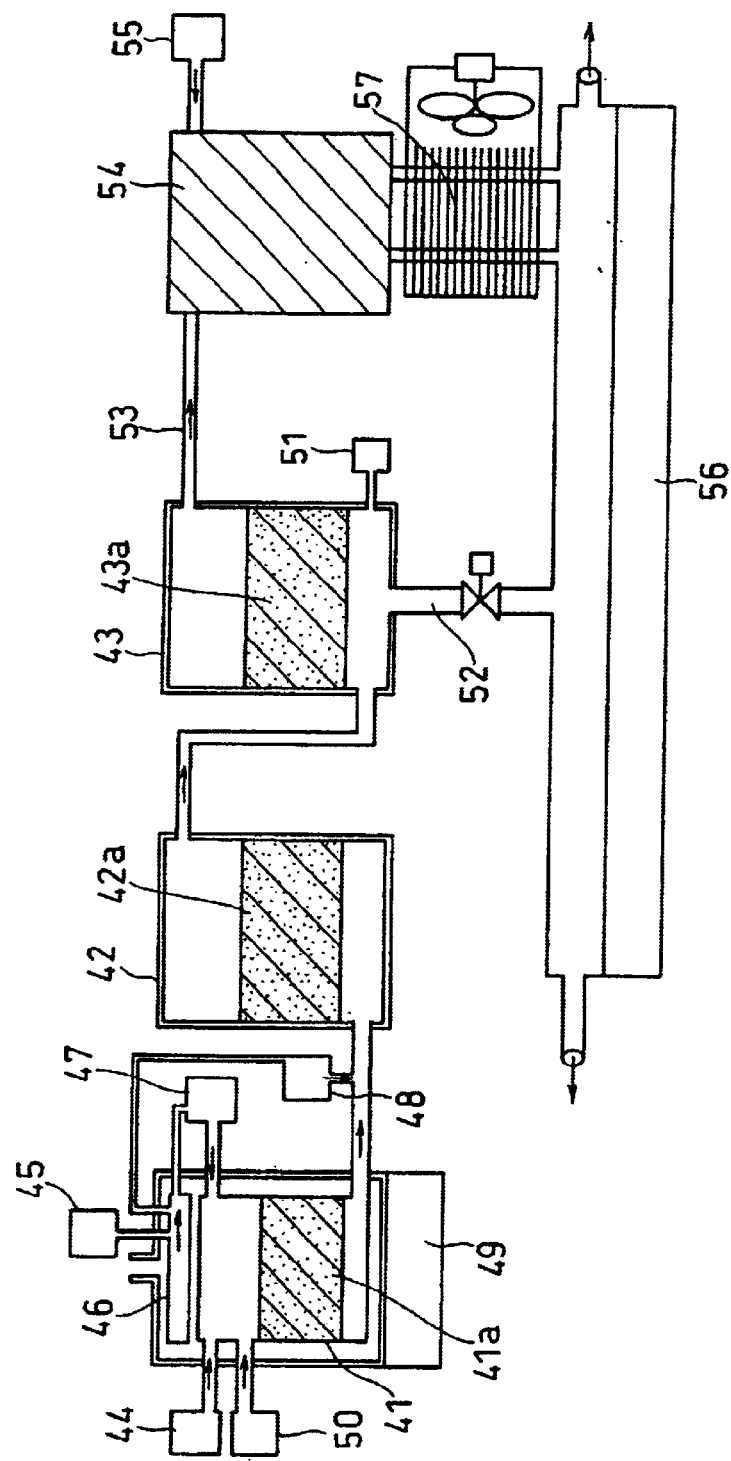
FIG. 6 is a schematic constitutional view of still another hydrogen generator used in the electric power generator of the present invention.

Next, a schematic constitutional view of still another embodiment of the hydrogen generator which can be used in the electric power generator of the present invention is shown in FIG. 6.

A hydrogen generator shown in FIG. 6 is equipped with a polymer electrolyte fuel cell 54, an oxidant gas supplier 55, a condensed water collecting tank 56 and a condenser 57. A reformer 41 and a steam generator 46 are heated with a heater 49. After the reformer 41 is heated to a predetermined temperature, a supply of a raw material fuel from a raw material fuel supplier 44 to the reformer 41 is started, and a supply of water from a water supplier 45 to a steam generator 46 is started. A part of the steam generated in the steam generator 46 is supplied to a steam supplier 47 and the remainder is supplied to a steam supplier 48. The steam supplied from the steam supplier 47 to the reformer 41 is mixed with the raw material fuel supplied from the raw material supplier 44, and this mixture reaches a reforming catalyst layer 41a to be used in a reforming reaction. An obtained reformed gas is mixed with the steam supplied from the steam supplier 48, and this mixture is used in a modifying reaction in a shifter 42.

An obtained modified gas is mixed with the air supplied from a purifying air supplier 51, and this mixture reaches a purifier 43 to be purified. Then an obtained generated gas is exhausted as a hydrogen rich gas from a generated gas outlet.

Using the generated gas and an oxidant gas supplied from the oxidant gas supplier 55, electric power generation is carried out in the polymer electrolyte fuel cell 54, and water content of the gas exhausted from the polymer electrolyte fuel cell 54 is condensed with the condenser 57 and is collected to the condensed water collector (tank) 56.

In this constitution, the condensed water exhausted from the condensed water outlet 52 is introduced to the condensed water collector 56. With this measure, exhaust water can be collected without being left dropping outside. At this time, a constitution in which the condensed water outlet 52 is positioned upward of the condensed water collector 56 is taken. With this constitution, a flow of water is created with gravitation and the collection of water is made easy.

Also, it is preferred that in the hydrogen generator which can be used in the electric power generator of the present invention, the shifter and the purifier are respectively equipped with a cooler and a temperature detector.

Further, it is preferred that at least one of the shifter and the purifier has a multistage structure and is equipped with a cooler and a temperature detector at each stage.

Accordingly, the present invention relates to a hydrogen generator equipped with: a reformer bringing a fuel containing at least carbon atoms and steam to a reforming reaction; a reforming temperature detector disposed in the reformer; a heater for heating the reformer, which is disposed in the upstream side in the flow direction of reaction substances from the reforming temperature detector; a CO reducer for reducing the concentration of carbon monoxide (CO) generated as a by-product in the reforming reaction of the reformer; a CO reducing temperature detector for detecting the temperature in the CO reducer; and a CO reducing cooler for cooling the CO reducer, which is disposed in the upstream side in the flow direction of reaction substances from the CO reducing temperature detector.

In this hydrogen generator, it is effective to control the temperature of the reformer by increasing or decreasing the heating amount of the heater on the basis of the temperature detected by the reforming temperature detector, and to control the temperature of the CO reducer by increasing or decreasing the cooling amount of the CO reducing cooler on the basis of the temperature detected by the CO reducing temperature detector.

Also, in the hydrogen generator of the present invention, it is preferable that the CO reducer comprises at least a CO shifter and a CO remover (purifier), a CO modifying cooler and a CO modifying temperature detector are provided in the CO shifter, and a CO removing cooler and a CO removing temperature detector are provided in the CO remover. In this case, the CO reducing temperature detector means both the CO modifying temperature detector and the CO removing temperature detector.

Further, it is preferable to constitute the CO shifter to have a multistage structure and the CO modifying cooler and the CO modifying temperature detector are disposed at each stage, and/or to dispose the CO removing cooler and the CO removing temperature detector are disposed at each stage.

It is effective that the CO remover uses selective oxidation reaction of CO or methanation reaction of CO.

Also, it is effective to dispose the reforming temperature detector in the outlet of the reformer or its vicinity and dispose the CO reducing temperature detector in the outlet of the CO reducer or its vicinity, or dispose the CO modifying temperature detector and the CO removing temperature detector in the outlet of the CO shifter or the CO remover or its vicinity.

Moreover, it is effective to dispose in the inlet of the CO reducing cooler or its vicinity, or dispose the CO modifying cooler and the CO removing cooler in the inlet of the CO shifter and the CO remover or its vicinity.

In addition, it is effective to transfer the heat collected in the CO modifying cooler and the CO removing cooler to at least a fluid flowing into the apparatus including the reformer.

Embodiment 8

Figure 7:
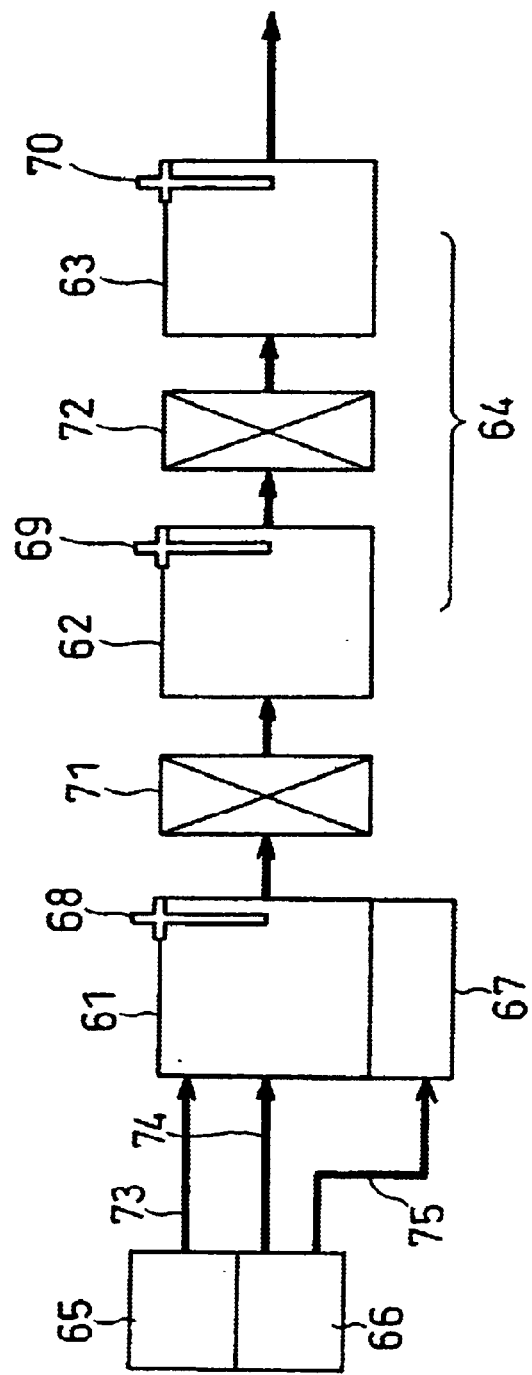
FIG. 7 is a schematic constitutional view of still another hydrogen generator used in the electric power generator of the present invention.

FIG. 7 is a schematic constitutional view of still another hydrogen generator which can be used in the electric power generator of the present invention. This hydrogen generator uses a steam reforming reaction and generates hydrogen by reacting a raw material fuel with steam. A reforming catalyst is filled in a reformer 61 and a modifying catalyst is filled in a shifter 62. Also, a CO removing catalyst is filled in a CO remover 63.

The shifter 62 and the CO remover 63 constitute a CO reducer 64. A steam supplier 65 supplies steam as a raw material for steam reforming and supplies steam to the reformer 61 via a steam supply pathway 73. A fuel supplier 66 supplies a fuel and a part of the fuel is transferred to the heater 67 as a burning fuel via a heating fuel supply pathway 75, and other part thereof is transferred to the reformer 61 as a raw material fuel via a reforming fuel supply pathway 74. In the heater 67, the burning fuel transferred from the fuel supplier 66 via the heating fuel supply pathway 75 burns and heats the reformer 61 with the burning heat.

In the direction of the flow of the gas, a reforming temperature detector 68 is provided in the vicinity of the outlet in the downstream side of the reformer 61, and a modifying temperature detector 69 is provided in the vicinity of the outlet in the downstream side of the shifter 62. Also, a CO removing temperature detector 70 is provided in the vicinity of the outlet in the downstream side of the CO remover 63. These temperature detectors detect the temperature of the gas after the reaction in the respective reactors.

Also, this hydrogen generator is equipped with a modifying cooler 71 disposed in the upstream side of the shifter 62 and a CO removing cooler 72 disposed in the upstream side of the CO remover 63.

A catalyst is disposed in the respective reformer 61, shifter 62 and CO remover 63. Herein, the case of using noble metal catalysts as the catalyst species in the respective portions is described, but base metal catalysts can be selected according to the use, purpose and the like. Possible forms of the carriers for carrying the catalysts are for example powder-form, pellet-form and honeycomb-form, and materials constituting the carriers can be suitably selected from ceramics, heat-resistant metals and the like. Herein, described is the case where a washcoat layer is formed on a ceramic honeycomb-form carrier and a noble metal is carried thereon. The noble metal can be suitably selected from platinum, rhodium, palladium and iridium, for example. Herein, a catalyst mainly composed of platinum is used in every portion.

As the fuel, there can be used, for example, gaseous hydrocarbon fuel such as natural gas (city gas) or LPG, or liquid hydrocarbon fuel such as kerosene or methanol. However, an apparatus for vaporizing the fuel is necessary when using the liquid fuel, and as vaporizing heat, usable is waste heat within the system such as sensible heat of the gas in the reformer outlet and burning heat produced when unburned gas such as hydrogen in the tale gas in the fuel cell is burned. When using such heat, an efficient operation as a whole apparatus is possible.

The CO remover 63 alone can correspond to the CO reducer 64 when methanol is used as the fuel, and the shifter 62 can be omitted. Water as another raw material is supplied in the form of steam from the steam supplier 65 to the reformer 61; however, vaporizing heat is necessary in addition, and it is efficient to use a method of vaporizing the above-mentioned liquid fuels. Herein, sensible heat of the gas in the reformer outlet is used, the constitution of which being omitted in the figure.

The arrow in FIG. 7 denotes a flow direction of gases such as the raw material, reaction substances and generated substances. As the reforming temperature detector 68, modifying temperature detector 69 and CO removing temperature detector 70, a thermistor can be used as well as a thermocouple.

In the embodiment shown in FIG. 7, hydrogen is generated by steam reforming. The temperature controlling method in the respective reactors will be described in the following. Since the steam reforming reaction proceeding in the reformer 61 is an endothermic reaction, heat necessary for the endothermic reaction is supplemented with the burning heat of the burner 67. When a hydrocarbon fuel is used, the reforming temperature is appropriate within a range from 650° C. to 750° C., but the optimal value is somewhat changed depending on the conditions such as the constitution of the reformer 61 and the mixing proportion of the fuel and the steam.

In general, it is desired to control in a range from minus 20° C. to plus 20° C. of the optimal temperature in the above temperature range. Herein, the temperature of the reformer 61 is controlled at a constant level by increasing or decreasing the burning amount of the heater 67 according to the temperature detected by the reforming temperature detector 68. Since the absorbed heat amount in the reforming reaction is large, the temperature of the reformer 61 changes relatively sensitive to the increase or decrease of the absorbed heat amount. Herein, the reforming reaction itself is a reversible reaction, the constitution of the generated gas after the reforming reaction is determined almost unambiguously by equilibrium with the temperature in the vicinity of the outlet. As a consequence, the temperature in the vicinity of the outlet is important from the viewpoint of controlling the reaction, and the performance of the reformer 61 can be maintained optimal by controlling the heating amount based on this temperature.

Next, the shifter 62 will be described. The optimal temperature of the shifter 62 is varied according to the type of the catalyst used and the reaction herein is a reversible reaction as well as in the case of the reformer 61. As a consequence, the control of the temperature is extremely important as well as in the case of the reformer 61, and the constitution of the modified gas exhausted is almost determined by the equilibrium of the controlled temperature. In general, the reaction temperature is controlled within a range of about 200° C. to 300° C.

However, the modifying reaction is an exothermic reaction, which is not in the case of the reformer 61. Consequently, the reaction proceeds and the temperature of the reactants increases as they go downstream along the flow direction of the gas. It is possible to cool a middle part of the shifter 62, but it is difficult to cool appropriately since the reaction position may slide depending on the conditions.

On the other hand, in this embodiment, since the temperature condition of the entire shifter 62 can be known by detecting the temperature in the downstream side with the modifying temperature detector 69, it is possible to know the appropriate cooling amount on the basis of this temperature. Herein, if the modifying cooler 71 is disposed in the upstream side, it is possible to cool the inlet of the shifter 62, and the highest temperature position throughout the entire shifter 62 is downstream side. As a result, the reaction equilibrium can be set below this temperature and it becomes possible to obtain a generated gas having an intended constitution, in particular CO concentration.

Next, the CO remover 63 will be described. Reactions known to be used in the CO remover 63 are selective oxidation reaction method and methanation reaction method. The selective oxidation reaction method comprises mixing a small amount of air into the modified gas before the catalyst and selectively oxidizing CO to decrease the concentration thereof. The methanation reaction method comprises reacting CO with hydrogen to decrease the concentration thereof. This embodiment employs the selective oxidation reaction method, and the inlet of the air is omitted in FIG. 7.

Since both reactions are exothermic reactions, with regard to the temperature distribution of the CO remover, the temperature at the outlet side is higher than that of the inlet side, similar to the case of the shifter 62. In general, the reaction temperature is operated within the range of about 100° C. to 200° C., but the optimal temperature range slightly varies depending on the conditions such as the catalyst used and the operation method. However, in any case, it is necessary to control appropriately the outlet temperature in order to avoid an increase in the CO concentration due to reverse shift reaction induced as a side reaction, and a decrease in the hydrogen concentration due to an excessive methanation reaction.

Thus, the most effective temperature controlling method is to control the temperature in the reaction section by the cooling operation in the upstream side while detecting the downstream outlet temperature of the CO remover 63. Here, on the basis of the temperature detected by the CO removing temperature detector 70 disposed in the vicinity of the outlet of the CO remover 63, the temperature of the CO remover 63 is controlled appropriately by increasing or decreasing the cooling amount of the CO removing cooler 72 disposed in the upstream side of the CO remover 63.

With this constitution, not only in the stationary state, of course, but also when the temperature of the respective reactors changes by some disturbances and the like, a quick action is possible and the temperature of the respective reactors can be controlled within an appropriate range. In order to change the amount of hydrogen to be generated, the supply amount of the raw material fuel and the supply amount of steam are first changed. Even in this case, it is possible to maintain the temperature of the respective reactors within an appropriate range by changing instantly the heating amount of the heater 67, and after that, changing diligently the cooling amount in the downstream side of the reformer 61 on the basis of the temperature detected by the respective reactors.

As a result of operation, the temperature change in the respective reactors can be controlled within 30° C. either in the case where the amount of hydrogen to be generated is changed from the maximum generation amount to one third thereof, or in the case where it is changed from one third to the maximum generation amount. The CO concentration in the generated hydrogen is within the range of 5 to 15 ppm, and the effectiveness of the constitution and the operation in this embodiment is confirmed.

The modifying cooler 71 and the CO removing cooler 72 cool some portions having several hundred degrees, and they can also be used as heat collectors. In this case, the heat efficiency of the apparatus can be improved by transferring collected heat to the raw materials and circulating it inside the apparatus. That is, collected heat can be utilized for fluid introduced in the apparatus, fuels (raw material fuel and burning fuel), water or steam, and the air for burning. Since these substances are generally introduced into the apparatus at room temperature or a temperature close to it, they can readily exchange heat with the collected heat in the above-mentioned cooler.

Embodiment 9

Figure 8:
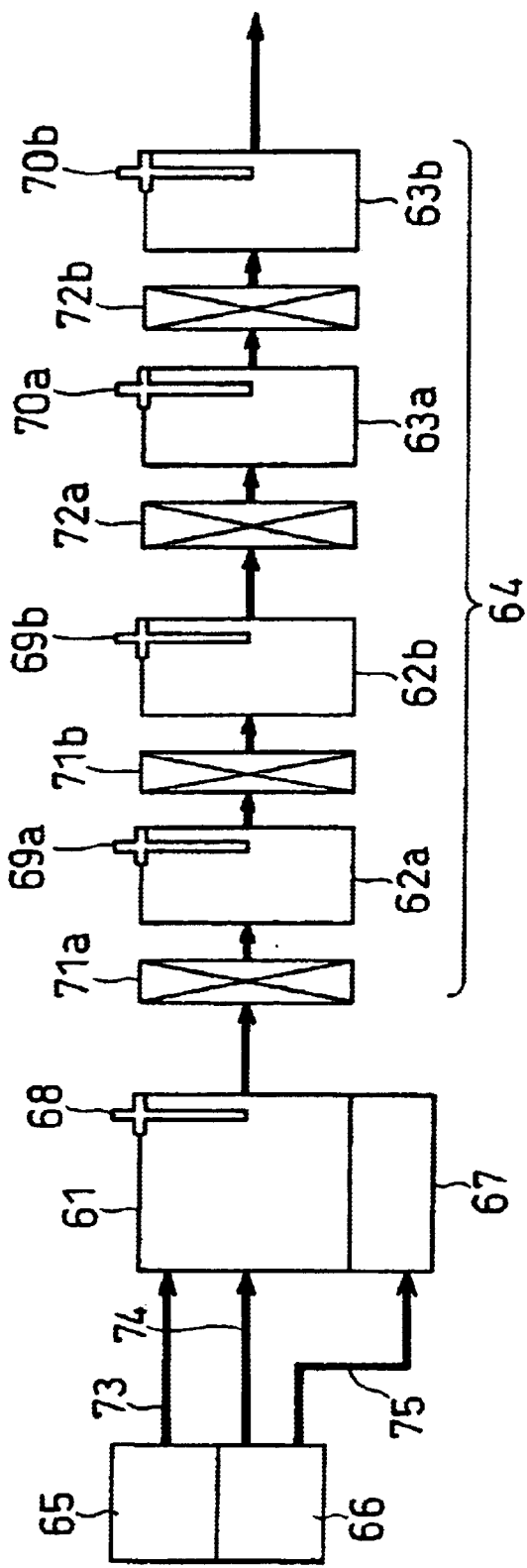
FIG. 8 is a schematic constitutional view of still another hydrogen generator used in the electric power generator of the present invention.

FIG. 8 is a schematic constitutional view of still another hydrogen generator which can be used in the electric power generator of the present invention. Constituting elements overlapping those in FIG. 7 are indicated with the same reference numerals and the explanation thereof is omitted. In the CO reducer 64 of the hydrogen generator shown in FIG. 8, the shifter 62 comprises a first shifter 62a and a second shifter 62b, and the CO remover 63 comprises a first CO remover 63a and a second CO remover 62b. That is, both the shifter 62 and the CO remover 63 are constituted by two stages. Two stages are formed here and it is also possible to increase stages further when necessary.

According to this constitution, a first modifying cooler 71a and a second modifying cooler 71b are provided as a modifying cooler 71, and a first modifying temperature detector 69a and a second modifying temperature detector 69b are provided as a modifying temperature detector 69. Further, a first CO removing cooler 72a and a second CO removing cooler 72b are provide as a CO removing cooler 72, and a first CO removing temperature detector 70a and a second CO removing temperature detector 70b are provided as a CO removing temperature detector 70.

With this constitution, the cooling amount of the first modifying cooler 71a can be increased or decreased on the basis of the temperature detected by the first modifying temperature detector 69a, and the cooling amount of the second modifying cooler 71b can be increased or decreased on the basis of the temperature detected by the second modifying temperature detector 69b. Also, the cooling amount of the first CO removing cooler 72a can be increased or decreased on the basis of the temperature detected by the first CO removing temperature detector 70a, and the cooling amount of the second CO removing cooler 72b can be increased or decreased on the basis of the temperature detected by the second CO removing temperature detector 70b. By this, it becomes possible to control more precisely the temperature of the shifter 62 and the CO purifier 63 in the hydrogen generator, thereby permitting improvements in the performance of the hydrogen generator.

It is also possible to collect heat in the first modifying cooler 71a, the second modifying cooler 71b, the first CO removing cooler 72a and the second CO removing cooler 72b, and allow the collected heat circulate thereby to improve the heat efficiency of the hydrogen generator.

Further, the present invention also provides a method for operating the electric power generator equipped with the hydrogen generator as described above.

That is, the present invention provides a method for operating an electric power generator equipped with: a hydrogen generator comprising a reformer, a shifter, a purifier, a gas pathway connecting the reformer, the shifter and the purifier, and a generated gas outlet; a polymer electrolyte fuel cell for generating electric power by using a generated gas from the hydrogen generator and an oxidant gas; a burner for heating at least the reformer; a flow rate controller for controlling a supply amount of a burning fuel to the burner; a communicating pathway connecting the flow rate controller and the burner; a joint where a residual fuel gas exhausted from a fuel electrode of the fuel cell and/or incompletely generated gas from the hydrogen generator are combined with the burning fuel in the communicating pathway; said method being characterized by supplying a raw material fuel and water to the reformer when the temperature of the gas pathway between the reformer and the shifter reaches a predetermined lower limit 1 after operating the burner.

In this operating method, it is effective that the above lower limit 1 is 100° C. to 400° C.

Also, it is effective that water is supplied between the reformer and the shifter such that the temperature of the gas pathway between the reformer and the shifter does not exceed a predetermined upper limit, and that the above upper limit is 250° C. to 500° C.

Further, it is effective to judge that the electric power generator is in the normal operation condition when the temperature in the downstream of the above purifier is at a predetermined lower limit 2 or higher, and it is effective that the lower limit 2 is 100° C. to 500° C.

In other words, the present invention relates to a hydrogen generator equipped with a raw material fuel supplier; a water supplier; an air supplier; a reformer including a reforming catalyst which reacts a raw material fuel and water; a heater which heats the reforming catalyst; a shifter including a modifying catalyst which reacts carbon monoxide and water; a purifier including a purifying catalyst which oxidizes carbon monoxide; a generated gas outlet which exhausts a generated gas having passed through the purifier; and a gas pathway which connects the raw material fuel supplier, the reformer, the shifter, the purifier and the generated gas outlet; the hydrogen generator supplying the air from the air supplier to the gas pathway which connects the shifter and the purifier; wherein the hydrogen generator is characterized by disposing a first temperature detector in the gas pathway connecting the reformer and the shifter, and starting the supply of the raw material fuel and water to the reformer when the temperature of the first temperature detector reaches a predetermined lower limit after the start of operation of the heater.

Herein, the fact that the lower limit of the first temperature detector is preferably 100° C. to 400° C. is because a deposition of carbon is caused at a higher temperature.

Moreover, it is preferable to dispose a water inlet in the gas pathway connecting the reformer and the shifter, set an upper limit to the temperature of the first temperature detector and supply water to the gas pathway so that the temperature of the first temperature detector does not exceed the above upper limit.

Herein, the fact that the upper limit of the first temperature detector is preferably 250° C. to 500° C. is because water is collected in the downstream side and the catalyst is deteriorated at a lower temperature.

Embodiment 10

Figure 9:
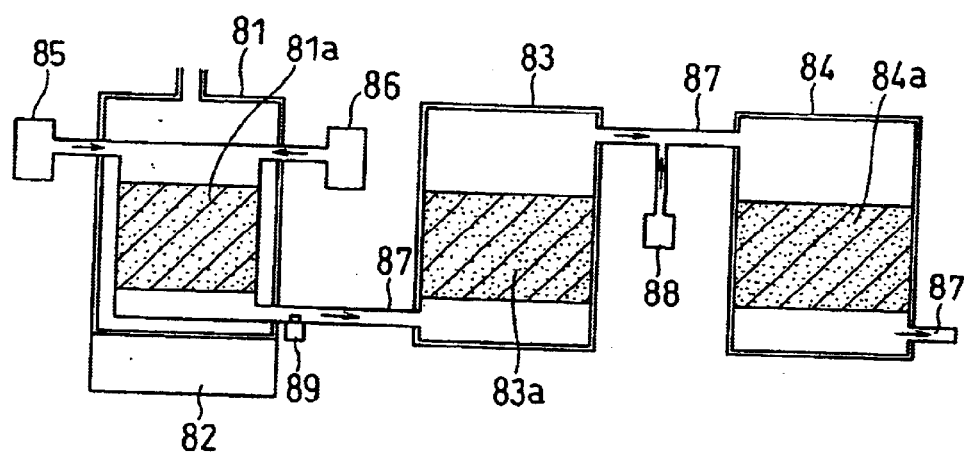
FIG. 9 is a schematic constitutional view of still another hydrogen generator used in the electric power generator of the present invention.

FIG. 9 is a schematic constitutional view of still another hydrogen generator which can be used in the electric power generator of the present invention. FIG. 9 shows a longitudinal cross sectional view of a pertinent portion of the hydrogen generator. In FIG. 9, a reformer 81 includes a reforming catalyst layer 81a conducting a steam reforming reaction. In the reforming catalyst layer 81a, a catalyst prepared by using a platinum type noble metal is used. A heater 82 heats the reformer 81 and a flame burner is used here. A shifter 83 is equipped with a modifying catalyst layer 83a. In the modifying catalyst layer 83a, a catalyst including at least copper as a component is used, for example.

The purifier 84 purifies carbon monoxide and includes a platinum type oxidizing catalyst layer 84a as a purifying catalyst. A raw material fuel supplier 85 supplies a raw material fuel mainly composed of hydrocarbon for the steam reforming reaction, and a water supplier 86 supplies water. A gas pathway 87 connects and communicates with the reformer 81, the shifter 83 and the purifier 84, allowing the gas to flow through the reformer 81, the shifter 83 and the purifier 84 in this order, and the purifier 84 has an outlet. An air supplier 88 supplies the air to the gas pathway 87 between the shifter 83 and the purifier 84. A first temperature detector 89 is disposed in the gas pathway 87 between the reformer 81 and the shifter 83 in order to detect the temperature of the gas having passed through the reformer 81.

Next, operation at the time of the supply of hydrogen in the hydrogen generator of this embodiment will be described. The heater 82 is operated and heats the reforming catalyst layer 81a of the reformer 81. Hydrocarbon components as raw material fuel are supplied from the raw material fuel supplier 85 to the reforming catalyst layer 81a of the reformer 81, water is supplied from the water supplier 86, and the steam reforming reaction is allowed to proceed. The temperature of the gas having passed through the reformer 81 (reformed gas) is measured at the first temperature detector 89. A lower limit is set to this temperature of the gas and the supply of the raw material and water to the reformer 81 is started when the detected temperature exceeds the lower limit. The gas having passed through the reformer 81 reaches the shifter 83 via the gas pathway 87. The gas having passed through the shifter 83 (modified gas) reaches the purifier 84 via the gas pathway 87. The gas having passed through the purifier 84 (purified gas) is exhausted outside via the gas pathway 87. Herein, the air is supplied from the air supplier 88 to the gas having passed through the shifter 83 in the gas pathway 87 between the shifter 83 and the purifier 84.

An object of this embodiment to generate hydrogen steadily. For this, it is necessary to operate the respective reactors of the reformer, the shifter and the purifier at appropriate temperatures. In particular, the reformer is a part in which a basic reaction of hydrogen generation proceeds and it is important to control the supply amount of the raw material fuel and water, and the temperature. Thus, water is supplied such that oxygen does not become insufficient for an equivalent amount necessary for the carbon atoms in the raw material fuel to react to become carbon dioxide.

In order that the raw material fuel reacts with water, it is necessary that water presents at least in the state of steam. However, in the case where the temperature of the reformer is low immediately after the start of operation of the apparatus, the reaction does not proceed because even if water is supplied, it does not present as steam sufficiently. In case a large quantity of water accumulates, there is a possibility of blocking the gas pathway. For this reason, in the present invention, the temperature of the gas having passed through the reformer is measured and the raw material fuel and water are supplied on the basis of this temperature. With this constitution, it is possible to vaporize water sufficiently and allow the reaction of the reformer to proceed effectively.

Next, operation of the hydrogen generator in this embodiment will be described. First, at the time of the start of the apparatus, the heater is operated to start heating the reformer. By heating the reforming catalyst layer of the reformer by the heater, the volume of the gas present in the reforming catalyst layer expands and the heated gas flows into the gas pathway. The first temperature detector measures the temperature of the gas having passed through the reforming catalyst layer. In this embodiment, the supply of the raw material fuel and water to the reformer 81 is started when the temperature of the gas having passed through the reformer 81 exceeds 100° C. at the first temperature detector.

Methane gas is used as hydrocarbon component, which is raw material fuel, and methane gas with added 2 mol or more water per 1 mol of methane gas is supplied to the reforming catalyst layer 81a of the reformer 81. In this embodiment, when the temperature value detected by the first temperature detector exceeds 100° C., the temperature of the reforming catalyst layer becomes also 100° C. or more, and it is confirmed that the supplied water can vaporize sufficiently. At the stationary state operation, the steam reforming reaction may be allowed to proceed while controlling the heating amount of the heater 82 so that the temperature detected by the first temperature detector is about 700° C.

The temperature of the reforming catalyst layer can be acknowledged more precisely by starting heating the reformer after supplying an inert gas such as nitrogen gas to the reformer before supplying the raw material fuel and water. Also, by starting the supply of the raw material fuel before the supply of water and vaporizing the raw material fuel by heating, substitution for nitrogen gas is possible. However, deposition of carbon may occur with the temperature of the reformer when the raw material fuel alone is carried to the reformer, so it is necessary to supply also water as quickly as possible.

It is possible to measure the temperature of the gas having passed through the reformer and use the measured value as judging criteria for the start of the supply of the raw material fuel and water, and also to measure directly the temperature of the reforming catalyst layer and use the measured value as judging criteria. In this embodiment, the temperature of the first temperature detector of 100° C. is taken as the criteria, but this can be suitably selected according to operation conditions such as the constitution of the generator, the type of the raw material, and the supply proportion of the raw material and water. The gas containing oxygen is not limited to the air and any gas containing oxygen can be used. Also, the heater is not limited to the flame burner and anything that can heat the reforming catalyst layer can be used.

Embodiment 11

Figure 10:
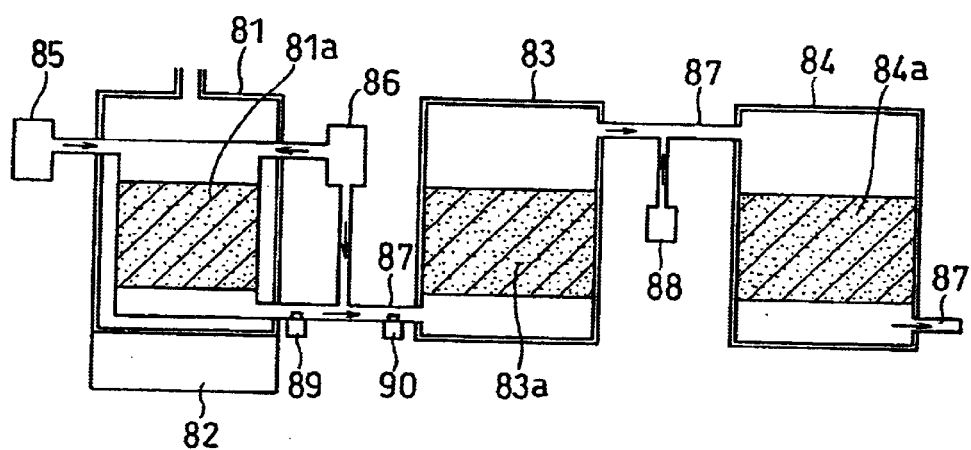
FIG. 10 is a schematic constitutional view of still another hydrogen generator used in the electric power generator of the present invention.

FIG. 10 shows a schematic constitutional view of still another hydrogen generator which can be used in the electric power generator of the present invention. This hydrogen generator has almost the same constitution and conducts almost the same operation as the one shown in FIG. 9.

Herein, a water supply pathway is disposed in a gas pathway 87 from a water supplier 86 between a reformer 81 and a shifter 83, and at the same time, a second temperature detector 90 is disposed in the gas pathway 87 in the downstream side from the water supply pathway.

Operation of this embodiment will be described. This hydrogen generator conducts almost the same operation with that in Embodiment 10 above. Herein, further, water is supplied to the gas pathway 87 between the reformer 81 and the shifter 83 from the water supplier 86 and such that the temperature of the second temperature detector does not exceed the upper limit.

In the hydrogen generator in general, the temperature of the reformer which is positioned in the upstream side of the flow of the gas is the highest and the temperature declines through the shifter and the purifier successively. Therefore, the shifter and the purifier are heated one after another with heat from the reformer, for example heat retained by the reformed gas or excess heat from the heater disposed in the reformer. However, the optimal reaction temperature is varied in the respective reactors, and finally, it is necessary to control to the temperature appropriate for the catalytic reaction in the respective reactors.

As a consequence, in this embodiment, the temperature of the gas is controlled by controlling temperature of the gas coming into the shifter and supplying water to the gas having passed through the reformer. By supplying water directly and cooling the gas by the latent heat by vaporization and sensible heat, there is the advantage that the apparatus constitution necessary for cooling can be made small compared with the case where the temperature of the gas is cooled by air cooling. Also, since water is added to the reformed gas, the reactivity of the modifying reaction between carbon monoxide and water can be further improved.

Next, an example of operation of the hydrogen generator in this embodiment is described. In the modifying catalyst layer, a catalyst mainly composed of copper and zinc is used, for example. Since the heat-resistant temperature of this catalyst is 300° C., the upper limit of the temperature of the second temperature detector is set to 300° C. By directly supplying water to the reformed gas, the responsibility of temperature adjustment can be remarkably improved compared with the case where the temperature is adjusted by air cooling. Also, the volume necessary for temperature control can be made about one tenth.

In the case where a catalyst mainly composed of iron and chromium is used, the upper limit becomes 500° C. This upper limit needs to be determined according to the type of the catalyst and the properties such as heat resistance. At the second temperature detector, it is possible to directly measure the temperature of the modifying catalyst layer in addition to the reformed gas and supply water on the basis of its temperature.

Embodiment 12

Figure 11:
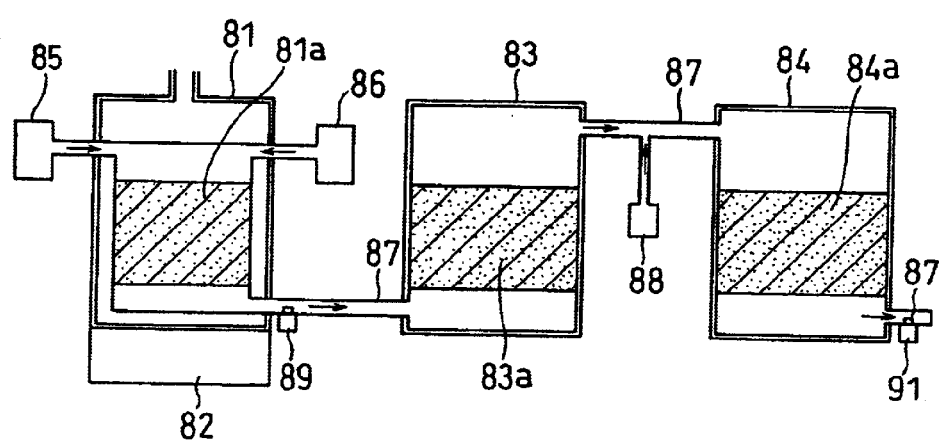
FIG. 11 is a schematic constitutional view of still another hydrogen generator used in the electric power generator of the present invention.

FIG. 11 shows a schematic constitutional view of still another hydrogen generator which can be used in the electric power generator of the present invention. Herein, a third temperature detector 91 is disposed in a gas pathway 87 in the downstream side of the purifier 84.

Next, operation of this embodiment will be described. The same operation as in Embodiment 10 is made at the start of the generator. The difference lies in that a lower limit is set to the temperature of the third temperature detector and possibility or impossibility of starting the supply of hydrogen from the hydrogen generator is judged when the temperature of the third temperature detector exceeds the lower limit.

In the case where this hydrogen generator is used as an apparatus supplying hydrogen to fuel cell, in particular polymer electrolyte fuel cell, it is necessary to supply the obtained hydrogen to the fuel cell after reducing carbon monoxide contained therein. The concentration of carbon monoxide in hydrogen can be measured with analyzing equipment using infrared rays and the like. However, from the viewpoint of increasing the cost and enlarging the size of the generator, it is not preferable to judge the operation condition of the generator by measuring the concentration of CO by the analyzing equipment.

In the present invention, the temperature of the gas in the downstream side of the purifier is measured and a lower limit is set thereto. When the temperature exceeds the lower limit, the concentration of carbon monoxide in the hydrogen gas to be supplied is decreased to a predetermined value or lower and is judged to be in a so-called normal operation condition, and the supply of hydrogen to outside apparatuses is made possible.

Then, an indication means indicating this normal operation condition or a generated gas exhaust pathway opening at normal operation condition is disposed at the generated gas outlet, thereby to control safe communication of the fuel with apparatus to be supplied with hydrogen gas.

Basically, the concentration of carbon monoxide can be reduced by operating the purifier effectively. The purifying ability of the purifying catalyst contained in the purifier towards carbon monoxide depends on the temperature. Therefore, the reduced state of the concentration of carbon monoxide is judged from the temperature of the gas in the downstream of the purifier. For example, when a platinum catalyst is used as the catalyst of the purifier, the carbon monoxide-oxidizing characteristics of this catalyst depends on the concentration of carbon monoxide in the gas at the entrance of the purifier. When the concentration of carbon monoxide is high, the reactivity is lowered. The amount of heat generated at oxidation of carbon monoxide and hydrogen basically depends on the amount of carbon monoxide and hydrogen reacted with oxygen. When the concentration of carbon monoxide at the entrance of the purifier is high, the reactivity is lowered. As a result, the amount of heat to be generated is decreased and the temperature of the gas having passed through the purifier is not much increased.

Next, in the case where the modifying reaction in the shifter proceeds and the concentration of carbon monoxide of the gas at the entrance of the shifter is lowered, the reactivity is increased. The proportion of this increase in the temperature is almost constant in the case where the amount of the air supplied to the purifier is constant. Therefore, it is possible to predict a decrease amount of carbon monoxide by measuring the gas temperature. Consequently, it is possible to set a lower limit to the temperature of the gas having passed through the purifier and on the basis of this temperature, it is possible to judge if the operation state of the apparatus is normal or not.

Next, an example of operation of the hydrogen generator in this embodiment will be described. A platinum catalyst is used for the purifying catalyst of the purifier. In the constitution of this embodiment, in the case where the temperature of the third temperature detector 91 becomes 100° C. or higher, the concentration of carbon monoxide in the gas having passed through the purifier 84 can be stably reduced to 20 ppm or lower. As a consequence, it is possible to judge the starting state of the hydrogen generator by setting a lower limit of 100° C. Since the temperature of the gas having passed through the purifier 84 essentially varies depending on factors such as the type of catalyst used, the use condition of the catalyst and the constitution of the apparatus, it is necessary to determine the lower limit according to these factors.

A similar effect can be obtained by using not only a catalyst having oxidizing property but also a catalyst which at least methanates carbon monoxide such as ruthenium catalyst. In this embodiment, the case of using methane as the hydrocarbon component of the raw material is described; however, those which are generally used as the raw material for steam reforming. i.e., hydrocarbon such as natural gas or LPG, alcohol such as methanol, or naphtha can be used as well.

Further, in the electric power generator of the present invention, it is effective to increase or decrease the amount of the raw material fuel and water supplied to the reformer after the amount of hydrogen rich gas supplied to the fuel cell is increased or decreased according to the increase or decrease of the amount of electric power generation of the fuel cell.

Accordingly, the present invention relates to an electric power generator comprising: a hydrogen generator equipped with a reformer including a reforming catalyst which reacts a raw material fuel and water, a heater which heats the reforming catalyst, and a raw material supplier which supplies the raw material fuel and water to the reforming catalyst: a fuel cell which conducts electric power generation with a fuel gas supplied by the hydrogen generator and an oxidant gas; the electric power generator supplying an exhaust gas (residual fuel gas) containing hydrogen exhausted by the fuel cell to the heater; the electric power generator being characterized in that the reforming raw material and water supplied to the reformer is increased or decreased after the amount of the fuel gas supplied to the fuel is increased or decreased corresponding to increase or decease in the amount of generated electric power by the fuel cell.

Thus, it is effective to provide a temperature detector for measuring the temperature of the reforming catalyst to measure the temperature of the reforming catalyst, and to adjust the heating amount of the heater on the basis of this temperature.

The electric power generator of the present invention is constituted by a reformer equipped with a reforming catalyst for reacting a raw material fuel containing at least carbon atoms with water, a heater for increasing the temperature of the reforming catalyst by burning a burning fuel, and a raw material supplier for supplying a raw material fuel and water to the reformer. Hydrogen is supplied from the hydrogen generator to the fuel cell, and at the same time, an exhaust gas (residual fuel gas) containing hydrogen from the fuel cell is supplied to the heater and is burned with the burning fuel. Here, after the consumption amount of hydrogen in the fuel cell is increased or decreased corresponding to the increase or decrease in the amount of generated electric power by the fuel cell, the raw material fuel and water supplied to the reformer is increased or decreased.

Also, a temperature detector for measuring the temperature of the reforming catalyst is provided in the reformer, and at the same time, an upper limit and lower limit are set to the temperature of the temperature detector and the burning amount of the burning fuel in the heater is adjusted on the basis of the temperature of the temperature detector.

By the above-mentioned method, problems in the conventional electric power generator including the fuel cell can be solved. Specifically, it is possible to stabilize the temperature in the hydrogen generator at the time of the change in the hydrogen supply amount as much as possible and correspond to the change in the amount of generated electric power by the fuel cell. Hereinafter, this embodiment will be described with reference to drawing.

Embodiment 13

Figure 12:
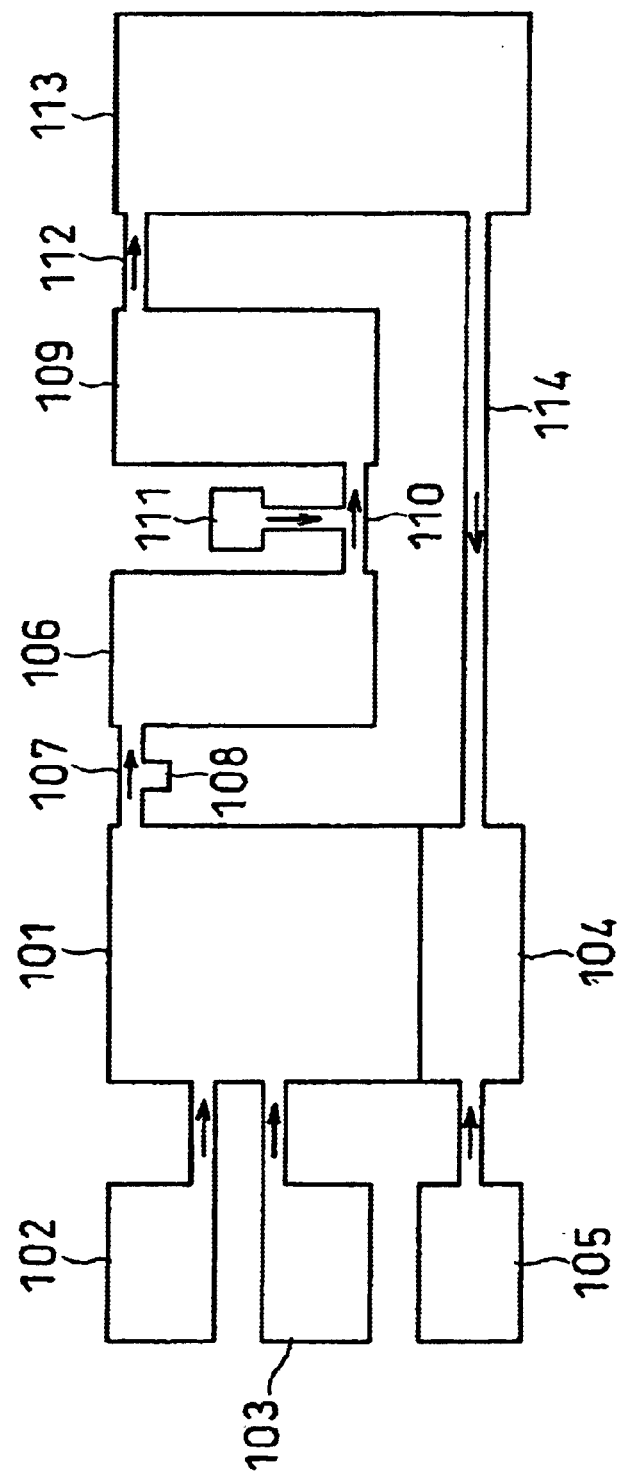
FIG. 12 is a schematic constitutional view of an electric power generator as one embodiment of the present invention.

FIG. 12 is a schematic constitutional view of the electric power generator of the present invention. In FIG. 12, a reformer 101 carries out steam reforming reaction. A water supplier 102 supplies water to the reformer 101 and a raw material fuel supplier 103 supplies a hydrocarbon gas serving as a raw material fuel to the reformer 101. A heater 104 heats the reformer 101 and a flame burner can be used, for example. A burning fuel supplier 105 supplies a combustible fuel to the heater 104. A shifter 106 is equipped with a modifying catalyst which is mainly composed of copper and zinc, and a gas obtained by the steam reforming reaction (reformed gas) is supplied from the reformer 101 via a gas pathway 107.

A temperature detector 108 measures the temperature of the reformed gas. A purifier 109 is equipped with a platinum type oxidizing catalyst as a purifying catalyst and purifies carbon monoxide by oxidation. A gas having passed through the shifter 106 (modified gas) is supplied to the purifier 109 via a gas pathway 110. An air supplier 111 is provided in the gas pathway 110 and mixes the air into the modified gas which is sent to the purifier 109.

As described above, the hydrogen generator is constituted by the reformer 101, the shifter 106, the purifier 109 and other constituents. Hydrogen is supplied to the electric power generator comprising a polymer electrolyte fuel cell 113 via a gas pathway 112. An exhaust gas (residual fuel gas) containing hydrogen which is not used in the fuel cell 113 is supplied to the heater 104 via an exhaust gas pathway 114.

Figure 13:
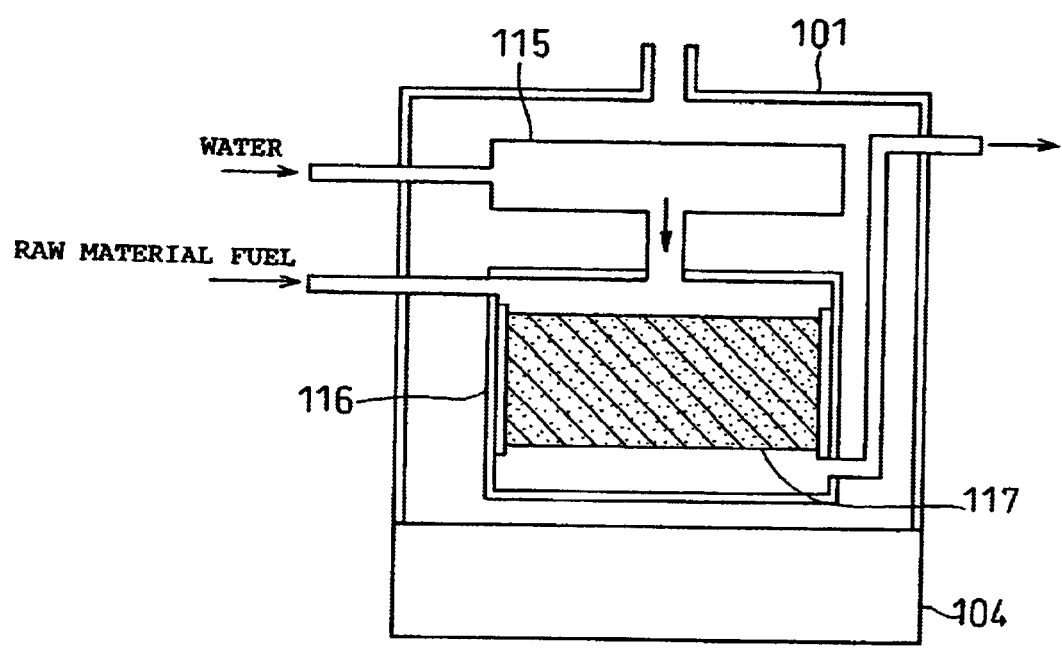
FIG. 13 is a schematic longitudinal cross sectional view showing a pertinent portion of a reformer in the electric power generator of the present invention.

Here, FIG. 13 is a schematic longitudinal cross sectional view showing more specifically a pertinent portion of the reformer 101. Water supplied from a water supplier (not shown) vaporizes by a vaporizer 115. A reforming catalyst layer 117 comprising a platinum type catalyst is provided in a reforming catalyst section 116 and a raw material fuel supplied from the raw material fuel supplier 103 is reacted with steam from a water vaporizing section. By the heater 104, the reforming catalyst section 116 and the vaporizer 115 are heated.

Next, operation at the time of the supply of hydrogen of the electric power generator according to this embodiment will be described. First, the heater 104 is operated to heat the reforming catalyst section 116. Then, methane gas as a raw material fuel is supplied from the raw material fuel supplier 103, water in an amount of 2 mol or more per one mol of methane gas is supplied from the water supplier 102 to the reforming catalyst section 116 of the reformer 101. In order to allow the reaction in the reforming catalyst layer 117 to proceed sufficiently, an upper limit is set so that the temperature of the temperature detector 108 becomes about 700° C., and the amount of the fuel burned in the heater 104 is controlled, thereby to carry out the steam reforming reaction.

The shifter 106 includes a copper-zinc type catalyst in order to react carbon monoxide in the reformed gas with water. The shifter 106 is operated at a temperature range of 250° C. to 300° C. To a gas having passed through the shifter 106 (modified gas), the air containing about twice as much oxygen as carbon monoxide is supplied from the air supplier 111 and an obtained mixed gas is sent to the purifier 109. Here, the amount of carbon monoxide may be determined by operating the electric power generator beforehand under the same condition. The purifier 109 includes a platinum type oxidizing catalyst contributing to the oxidation reaction and reduces carbon monoxide down to 20 ppm or lower.

Next, a hydrogen rich gas generated in the hydrogen generator is supplied to the polymer electrolyte fuel cell 113 which is an electric power generation section, and it is operated at an amount of electricity to be generated as rated of 1 kW. Herein, since the hydrogen rich gas contains gases such as carbon dioxide which cannot be used in the electric power generation, it is difficult to make the hydrogen consumption 100% in the fuel cell. In general, when the electric power generation is conducted stably, the electric power generator is operated on the assumption that the utilization rate of hydrogen supplied is 60 to 80%. As a result, a gas containing hydrogen is constantly exhausted as a residual fuel gas from the fuel cell 113. As a consequence, the electric power generator of the present invention utilizes this residual fuel gas as a part of the burning fuel in the heater of the hydrogen generator. That is, the exhaust gas exhausted by the fuel cell contains hydrogen, and this is supplied to the heater 104 via the exhaust gas pathway 114 thereby to be burned with the burning fuel. Herein, an upper limit is set so that the temperature of the temperature detector 108 becomes 700° C. thereby to control the heating amount of the heater 104.

In the fuel cell, hydrogen is consumed corresponding to the amount of generated electric power. In the case where the amount of generated electric power is changed, it is necessary to change the hydrogen amount supplied from the hydrogen generator. However, if the hydrogen supply amount from the hydrogen generator is changed rapidly, the temperature balance in the hydrogen generator is lost and a stable supply of hydrogen becomes impossible. Therefore, in the present invention, first the hydrogen amount to be consumed is increased or decreased according to the increase or decrease of the amount of generated electric power. By this, the amount of generated electric power can be changed quickly.

In doing so, since the amount of gas to be generated itself in the hydrogen generator does not change even if the amount of generated electric power is changed, the temperature balance in the hydrogen generator is not lost and a stable supply of hydrogen is possible. Also, since the hydrogen amount which returns from the fuel cell to the heater is changed, the burning amount in the heater is changed. This change in the burning amount can be compensated by adjusting the amount of the burning fuel supplied to the heater. After this operation, by changing the supply amount of the raw material fuel and water according to the change in the amount of generated electric power within a range of hydrogen supplying capacity of the hydrogen generator, the operation according to the hydrogen amount appropriate for the electric power generation is conducted in the end. By the above operation, it is possible to stabilize as much as possible the temperature of the hydrogen generator when the hydrogen supply amount is changed, and change the amount of generated electric power by the fuel cell.

Next, an example of operation of the above-described electric power generator will be described. Herein, the utilization rate of hydrogen is set to about 70% of the supply amount of hydrogen and 1 kW of electric power generation as rated is supposed in operation. At this state, operation to increase or decrease the amount of generated electric power is made. First, the case of decreasing the amount of generated electric power from 1 kW to 0.5 kW is explained. The amount of generated electric power is controlled by decreasing the hydrogen utilization rate in the fuel cell from 70%. Herein, the residual fuel gas from the fuel cell is burned in the heater and the heating amount of the heater is controlled by adjusting the supply amount of the burning fuel. In the case where the electric power generation is decreased while fixing the hydrogen supply amount, there is no problem in the electric power generation state since there is room in the hydrogen utilization rate. However, when the amount of generated electric power is greatly decreased, the hydrogen amount to be returned to the heater is increased and there is a case where the heater burns excessively. Even in the case where the amount of generated electric power is decreased, it is necessary to decrease the supply amount of the raw material fuel and water according to the amount of generated electric power after the hydrogen utilization rate is decreased.

Next, as an operation of increasing the amount of generated electric power, the case of increasing the amount of generated electric power from 1 kW to 1.3 kW is described. The amount of generated electric power is controlled by increasing the hydrogen utilization rate in the fuel cell from 70%. However, although an instant change in the amount of generated electric power can be dealt with, a continuous stable electric power generation is not possible in the state as it is because the hydrogen utilization rate is increased. As a consequence, the supply amount of the raw material fuel and water is increased so that hydrogen in the amount corresponding to the amount of generated electric power can be supplied. By this operation, the amount of generated electric power can be changed without making the electric power generation unstable. Herein, it is necessary to supply the raw material fuel and water so as not to lose the temperature balance in the hydrogen generator.

On the other hand, when the hydrogen supply amount is increased instantly corresponding to the amount of generated electric power, the temperature balance in the hydrogen generator is lost, the concentration of carbon monoxide in the gas at the exit of the hydrogen generator exceeds 20 ppm and the electric power generation becomes unstable. Unfortunately, since there is a limit in the increase in the hydrogen utilization rate, there is a limit in the amount of generated electric power that can be increased instantly. Consequently, in order to greatly increase the amount of generated electric power, first the amount of generated electric power is increased up to the limit of the hydrogen utilization rate. Then, after increasing the hydrogen supply amount, it is necessary to increase again the amount of electric power to be generated.

The amount of generated electric power is made 1 kW as rated, the amount of generated electric power itself is not determined. By setting the upper limit of the temperature of the temperature detector 108 to 700° C., the burning amount of the residual gas with the burning fuel in the heater is controlled and the temperature of the reforming catalyst 117 is controlled The above upper limit should not be restricted to 700° C. and it should be determined suitably according to the type of catalyst used and the constituents of the apparatus, for example. As the heater, one which can heat the reforming catalyst may be used other than the flame burner. There is no particular limitation to the burning method. Usable hydrocarbon components in the raw material fuel are those which are generally used as raw material for the steam reforming, for example, hydrocarbons such as natural gas and LPG, alcohol such as methanol, naphtha in addition to methane.

Industrial Applicability

According to the present invention, since a pressure-transferring pipe for transferring a pressure change in the downstream side of the flow rate controller for burning fuel to the flow rate controller, the burning state of the burner can be maintained stably if the burning fuel gas amount mixed into the joint is increased or decreased, and the off gas from the fuel electrode and/or the hydrogen generator can be supplied to the burner without being exhausted outside Since the off gas is not exhausted outside, the possibility that combustible gas containing hydrogen catches fire can be eliminated and the operation efficiency of the electric power generator can be improved.

Further, by providing a switching valve between the joint and the pressure-transferring pipe, it is possible to close the switching valve at the stop of operation and shut off the joint from the pressure-transferring pipe and the flow rate controller; consequently, diffusion of the off gas to the pressure-transferring pipe and the flow rate controller can be prevented. Then, since generation of condensed water from steam contained in the off gas can be prevented, the burning state of the burner can be stabilized even with repetition of stop and restart of operation.

Moreover, according to the present invention, by disposing a condensed water outlet in at least one section among the reformer, the shifter, the purifier, the generated gas outlet and the gas pathway, condensed water collected in the gas pathway can be exhausted in the case where the operation is stopped shortly after the start of operation and the operation is recommenced later; as a consequence, the time before reaching the catalyst active temperature of the purifier, that is, the starting time of the fuel cell can be shortened.

In addition, by disposing a switching valve in the condensed water outlet, the switching operation can be made easily, and by making the switching operation of the switching valve at a certain time at the start and restart of operation, it can be prevented that the switching valve remains open even when no more condensed water presents and hydrogen rich gas on the way of generation is exhausted.

Further, by synchronizing the operation of the switching valve with purge operation in the gas pathway of the hydrogen generator by an inert gas which is conducted before the start of operation and before the restart of operation, condensed water in the gas pathway can be exhausted from the condensed water outlet before the start or restart of operation without fail.

In addition, by introducing exhaust water exhausted from the condensed water outlet to the collection section of condensed water collected from the gas exhausted from the polymer electrolyte fuel cell, exhaust water can be collected without being left dropping outside. Herein, by constituting such that the condensed water outlet is positioned upward of the condensed water collection section, a flow of water is created with gravitation and collection of condensed water in the collection section becomes easy.

Moreover, according to the present invention, by disposing a temperature detector in the downstream vicinity of the reformer using catalyst reaction and CO reducer (shifter and CO remover), and by increasing and decreasing the heating amount of the reformer on the basis of the temperature detected by the temperature detector in the reformer, and also by increasing and decreasing the cooling amount of the cooler disposed in the upstream side on the basis of the detected temperature in the CO remover, appropriate temperature control of the respective reactors becomes possible and the generation of gas having a high reliability is possible.

Also, according to the present invention, the reaction of the reformer can progress effectively and the state where water stays inside the hydrogen generator can be prevented. Further, the apparatus constitution required for cooling can be made small and the reactivity in the modifying reaction of carbon monoxide with water can be further improved. Moreover, ensuring the reactivity of the reformer at the start of operation, improvement of workability of the shifter in the stationary state, and the judgement of the starting state of hydrogen generator can be made with a relatively simple constitution.

In addition, according to the present invention, by disposing a temperature detector measuring the temperature of the reforming catalyst in the reformer, setting an upper limit and lower limit to the temperature of the temperature detector, and adjusting the fuel burning amount of the heater on the basis of the temperature of the temperature detector, the amount of generated electric power of the fuel cell can be changed quickly. Also, since the temperature balance in the hydrogen generator is never lost along with the change in the amount of generated electric power, a stable electric power generation is possible even when the amount of generated electric power is changed.

What is claimed is:

1. An electric power generator equipped with: a hydrogen generator comprising a reformer, a shifter, a purifier, a gas pathway connecting said reformer, said shifter and said purifier, and a generated gas outlet; a polymer electrolyte fuel cell for generating electric power by using a generated gas from said hydrogen generator and an oxidant gas; a burner for heating at least said reformer; a flow rate controller for controlling a supply amount of a burning fuel to said burner; a communicating pathway connecting said flow rate controller and said burner; a joint where a residual fuel gas exhausted from a fuel electrode of said fuel cell and/or an incompletely generated gas from said hydrogen generator are combined with said burning fuel in said communicating pathway;

characterized by further comprising a pressure-transferring pipe which transfers a pressure between said joint and said flow rate controller to said flow rate controller, said flow rate controller controlling said supply amount of said burning fuel on the basis of said pressure.

2. The electric power generator in accordance with claim 1, characterized in that said flow rate controller comprises a valve, which moves by said pressure between said joint and said flow rate controller.

3. The electric power generator in accordance with claim 1, characterized in that said hydrogen generator is equipped with a condensed water outlet.

4. The electric power generator in accordance with claim 3, characterized in that said hydrogen generator is equipped with said condensed water outlet in at least one selected from the group consisting of said reformer, said shifter, said purifier, said gas pathway and said generated gas outlet.

5. The electric power generator in accordance with claim 3, characterized in that said condensed water outlet is equipped with a switching valve.

6. The electric power generator in accordance with claim 1, characterized in that each of said shifter and said purifier is equipped with a cooler and a temperature detector.

7. The electric power generator in accordance with claim 6, characterized in that at least one of said shifter and said purifier has a multistage structure and each stage is equipped with said cooler and said temperature detector.

8. A method for operating an electric power generator equipped with: a hydrogen generator comprising a reformer, a shifter, a purifier, a gas pathway connecting said reformer, said shifter and said purifier, and a generated gas outlet; a polymer electrolyte fuel cell for generating electric power by using a generated gas from said hydrogen generator and an oxidant gas; a burner for heating at least said reformer; a flow rate controller for controlling a supply amount of a burning fuel to said burner; a communicating pathway connecting said flow rate controller and said burner; a joint where a residual fuel gas exhausted from a fuel electrode of said fuel cell and/or incompletely generated gas from said hydrogen generator are combined with said burning fuel in said communicating pathway;

said method being characterized by supplying a raw material fuel and water to said reformer when the temperature of said gas pathway between said reformer and said shifter reaches a predetermined lower limit 1 after operating said burner.

9. The method for operating an electric power generator in accordance with claim 8, characterized in that said lower limit 1 is 100° C. to 400° C.

10. The method for operating an electric power generator in accordance with claim 8, characterized by supplying water between said reformer and said shifter such that the temperature between said reformer and said shifter does not exceed a predetermined upper limit.

11. The method for operating an electric power generator in accordance with claim 10, characterized in that said upper limit is 250° C. to 500° C.

12. The method for operating an electric power generator in accordance with claim 8, characterized by judging that said electric power generator is in the normal operation condition when the temperature at the downstream of said purifier is not higher than a predetermined lower limit 2.

13. The method for operating an electric power generator in accordance with claim 12, characterized in that said lower limit 2 is 100° C. to 500° C.

14. The method for operating an electric power generator in accordance with claim 8, characterized by controlling the temperature of said reformer by heating with said burner and controlling the temperature of said shifter and said purifier by cooling.

15. The method for operating an electric power generator in accordance with claim 8, characterized by increasing or decreasing a supply amount of said raw material fuel and water to said reformer after increasing or decreasing a supply amount of said generated gas to said fuel cell according to increase or decrease of an amount of generated electric power by said fuel cell.

* * * * *

UNITED STATES PATENT AND TRADEMARK OFFICE
CERTIFICATE OF CORRECTION

PATENT NO.     : 6,797,420 B2
DATED          : September 28, 2004
INVENTOR(S)    : Kunihiro Ukai et al.

It is certified that error appears in the above-identified patent and that said Letters Patent is hereby corrected as shown below:

Title page,
Item [56], References Cited, FOREIGN PATENTS, please add: -- Japanese Examined Patent Publication No. 1642 (w/partial English translation)pp. 21-22 --

Signed and Sealed this

Twenty-sixth Day of April, 2005

JON W. DUDAS
*Director of the United States Patent and Trademark Office*